United States Patent
Ohba et al.

(10) Patent No.: US 8,274,687 B2
(45) Date of Patent: Sep. 25, 2012

(54) IMAGE FORMING APPARATUS, ACCESS CONTROL METHOD, AND COMPUTER-READABLE RECORDING MEDIUM RECORDING ACCESS CONTROL PROGRAM

(75) Inventors: Shin Ohba, Toyokawa (JP); Eiichi Yoshida, Toyokawa (JP); Kenichi Matsumoto, Yokohama (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 606 days.

(21) Appl. No.: 12/435,727

(22) Filed: May 5, 2009

(65) Prior Publication Data

US 2009/0290193 A1    Nov. 26, 2009

(30) Foreign Application Priority Data

May 26, 2008   (JP) ................................. 2008-136450

(51) Int. Cl.
   *G06F 3/12*   (2006.01)
(52) U.S. Cl. .......................... 358/1.15; 358/1.1; 358/1.9
(58) Field of Classification Search ................. 358/1.15, 358/1.1, 1.13
   See application file for complete search history.

(56) References Cited

U.S. PATENT DOCUMENTS

2006/0129912 A1* 6/2006 Kunori ....................... 715/501.1
2007/0086051 A1* 4/2007 Kunori ......................... 358/1.15

FOREIGN PATENT DOCUMENTS

| EP | 1 962 197 | 8/2008 |
|---|---|---|
| JP | 2002-207663 | 7/2002 |
| JP | 2003-241954 | 8/2003 |
| JP | 2005-132023 | 5/2005 |
| JP | 2006-203317 | 8/2006 |
| JP | 2007-141215 | 6/2007 |
| JP | 2006-192878 | 7/2007 |
| JP | 2007-259356 | 10/2007 |
| WO | WO-2007/069338 | 6/2007 |

OTHER PUBLICATIONS

Japanese Notice of Grounds of Rejection mailed Apr. 6, 2010, directed to counterpart Japanese Patent Application No. 2008-136450; 7 pages.

* cited by examiner

*Primary Examiner* — King Poon
*Assistant Examiner* — Iriana Cruz
(74) *Attorney, Agent, or Firm* — Morrison & Foerster LLP

(57) ABSTRACT

An image forming apparatus includes: a communication interface accessing Web addresses; a memory for storing predetermined addresses; a first determination unit for determining whether the image forming apparatus is in a first state that access of the image forming apparatus is limited to the predetermined addresses or a second state that the image forming apparatus is permitted to access any addresses; a second determination unit for determining whether a designated address is included in the predetermined addresses, when the image forming apparatus is in the first state; and a permission unit for giving to the communication interface permission to access the designated address, when the designated address is included in the predetermined addresses.

19 Claims, 17 Drawing Sheets

FIG.5

(a) CASE OF LICENSE FOR FULL VERSION    106-2

| LICENSE INFORMATION | EXPIRATION INFORMATION |
|---|---|
| FULL VERSION | — |

(b) CASE OF LICENSE FOR TRIAL VERSION    106-2

| LICENSE INFORMATION | EXPIRATION INFORMATION |
|---|---|
| TRIAL VERSION | 2007/2/12 |

(c) CASE OF NO LICENSE    106-2

| LICENSE INFORMATION | EXPIRATION INFORMATION |
|---|---|
| NO LICENSE | — |

FIG.6    106-3

| TITLE OF WEB PAGE | URL INFORMATION |
|---|---|
| HOMEPAGE FOR TRIAL VERSION | http://xxxx.com |
| LINK INFORMATION OF OPERATION MANUAL 414 | http://xxxx.com/UserManual.pdf |
| LINK INFORMATION OF RESTRICTIONS 415 | http://xxxx.com/Readme.html |
| LINK INFORMATION OF VOICE GUIDANCE 416 | http://xxxx.com/Voice.mp3 |
| TRANSMISSION/RECEPTION FOLDER FOR WEB SITE (TRIAL VERSION) | http://yyyy.com/ScanFolder1/ |

FIG.7    106-5

| TITLE OF IMAGE FILE | URL INFORMATION |
|---|---|
| SCENIC IMAGE 417 | http://xxxx.com/Building.tif |
| ImageA.jpg | http://yyyy.com/ScanFolder1/ImageA.* |
| ImageB.tif | http://yyyy.com/ScanFolder1/ImageB.* |

FIG.18

```
<html>
 <head>
 TRANSMITTABLE/RECEIVABLE FOLDER
  <title>
   TRANSMISSION/RECEPTION FOLDER FOR WEB SERVER A
  </title>
 </head>                    800
 <body>
 <a href="http://yyyy.com/ScanFolder1/">TRANSMISSION/RECEPTION FOLDER
FOR WEB SERVER A</a> <br>
  <a href="ImageA.jpg"></a> <br>   801
  <a href="ImageB.tif"></a> <br>   802
  <a href="ImageC.pdf"></a> <br>
 </body>
</html>        803
```

IMAGE FORMING APPARATUS, ACCESS CONTROL METHOD, AND COMPUTER-READABLE RECORDING MEDIUM RECORDING ACCESS CONTROL PROGRAM

This application is based on Japanese Patent Application No. 2008-136450 filed with the Japan Patent Office on May 26, 2008, the entire content of which is hereby incorporated by reference.

BACKGROUND OF THE INVENTION

1. Field of the Invention

The present invention relates to an image forming apparatus that can be connected to a network, an access control method in the image forming apparatus, and a computer-readable recording medium that records an access control program for controlling access by the image forming apparatus.

2. Description of the Related Art

Conventional image forming apparatuses have a function of accessing an external server via a network. In particular, there has been known an image forming apparatus capable of utilizing a Web browser. Such an image forming apparatus displays information, which is downloaded via a network, through use of a Web browser. Then, a printer of the image forming apparatus prints out the downloaded information. Therefore, this image forming apparatus can eliminate such an effort that a user views a desired Web page through a Web browser on his/her personal computer, issues a printing command to the personal computer, and moves to an image forming apparatus in order to take printed matter. Particularly, the image forming apparatus capable of utilizing a Web browser directly can offer a considerably effective advantage to a user having a personal computer which is not connected to a network nor an image forming apparatus.

On the other hand, in a case where an adequate network environment is established and a distance between a personal computer and an image forming apparatus is short, a user moves to the image forming apparatus in order to take printed matter without effort.

For this reason, a Web browser function is added optionally to an image forming apparatus as one of functions of the image forming apparatus. That is, a purchaser, who intends to purchase an image forming apparatus, can make a choice whether to add such a Web browser function to the image forming apparatus to be purchased. However, it is difficult for the purchaser to grasp a merit of the Web browser function in a case where he/she does not actually utilize the Web browser function ever. For example, even when a sales person appeals the convenience of the Web browser function to the purchaser with a catalog or the like, this appeal does not lead to enhancement in appetite for purchasing of the Web browser function.

In order to solve the problem described above, a predetermined trial period is provided for a product the merit of which can not be grasped by a user with ease in a case where he/she does not actually use such a product ever. The user who intends to purchase the product can actually use the product during the trial period. Thus, the user can determine whether the product is convenient before purchasing the product.

For example, Japanese Laid-Open Patent Publication No. 2006-192878 discloses an information processing method implemented in an image forming apparatus which is connected to a network so as to establish data communications and utilizes a browser for receiving a Web page via the network and displaying contents of the received Web page. This method includes a step of displaying information about contents of a Web page, the display of which is permitted by the browser, on activation, a step of determining whether information about a link to a different Web page is selected, the link information being contained in the Web page the display of which is permitted by the browser, and a step of, when the link information of the different Web page is selected, imposing a restriction on access to the different Web page.

However, the Web browser has not only functions concerning an image forming apparatus, but also a function of searching for a Web site and a function of viewing a Web page. That is, the Web browser can be used for various purposes. Consequently, if a user can fully utilize the Web browser function of the image forming apparatus during the trial period, he/she occasionally accesses a harmful Web site or a charged Web site. Moreover, if one user uses the image forming apparatus in order to search for a Web site or view a Web page, another user can not use the image forming apparatus.

SUMMARY OF THE INVENTION

The present invention has been devised to solve the problems described above, and an object thereof is to provide an image forming apparatus that imposes a restriction on access to an external address via a network and permits access to a predetermined address, thereby improving the convenience thereof, an access control method in the image forming apparatus, and a computer-readable recording medium that records an access control program for controlling the access by the image forming apparatus.

According to one aspect of the present invention, there is provided an image forming apparatus. This image forming apparatus includes: a communication interface for accessing Web addresses; a memory for storing predetermined addresses; a first determination unit for determining whether the image forming apparatus is in a first state that access of the image forming apparatus is limited to the predetermined addresses or a second state that the image forming apparatus is permitted to access any addresses; a second determination unit for determining whether a designated address is included in the predetermined addresses, when the first determination unit determines that the image forming apparatus is in the first state; and a permission unit for giving to the communication interface permission to access the designated address, when the second determination unit determines that the designated address is included in the predetermined addresses.

Preferably, when the second determination unit determines that the designated address is not included in the predetermined addresses, the permission unit prohibits the communication interface from accessing the designated address.

Preferably, in the first state, use of the Web browser is permitted during only a predetermined period, and in the second state, the use of the Web browser is not restricted.

Preferably, the memory previously stores at least one URL (Uniform Resource Locator) as the predetermined address.

Preferably, the image forming apparatus further includes a display for displaying an image based on image data received by the communication interface.

Preferably, the image forming apparatus further includes a printer for printing out an image based on image data received by the communication interface.

Preferably, the image forming apparatus further includes a counter for keeping a count of printed sheets of paper at the time when the printer prints. Herein, when the first determination unit determines that the image forming apparatus is in the first state, the counter does not keep a count of printed sheets of paper based on the image data received by the communication interface.

Preferably, the image forming apparatus further includes a scanner for scanning an image to obtain image data. Herein, the communication interface uploads the image data onto the designated address.

Preferably, the image forming apparatus further includes an edit unit that performs an editing process on the image data uploaded by the communication interface.

Preferably, the editing process includes at least one of an OCR (Optical Character Reader) process, a file format conversion process, a translation process and a bind process.

Preferably, the predetermined addresses include a URL for giving voice guidance.

According to another aspect of the present invention, there is provided an access control method in an image forming apparatus. The image forming apparatus includes a processor; a communication interface for accessing Web addresses and a memory for storing predetermined addresses. The access control method includes the steps of: determining whether the image forming apparatus is in a first state that access of the image forming apparatus is limited to the predetermined addresses or a second state that the image forming apparatus is permitted to access any addresses; determining whether a designated address is included in the predetermined addresses, when the image forming apparatus is in the first state; and giving to the communication interface permission to access the designated address, when the designated address is included in the predetermined addresses.

Preferably, the access control method further includes the step of prohibiting the communication interface from accessing the designated address when the designated address is not included in the predetermined addresses.

Preferably, in the first state, use of the Web browser is permitted during only a predetermined period, and in the second state, the use of the Web browser is not restricted.

Preferably, the memory previously stores at least one URL as the predetermined address.

Preferably, the access control method further includes the step of displaying an image based on image data received by the communication interface.

Preferably, the access control method further includes the step of printing out an image based on image data received by the communication interface.

Preferably, the access control method further includes the step of keeping a count of printed sheets of paper that is based on image data received by the communication interface, when the image forming apparatus is in the first state; and keeping a count of printed sheets of paper, when the image forming apparatus is in the second state.

Preferably, the access control method further includes the steps of: scanning an image to obtain image data; and uploading the image data onto the designated address through the communication interface.

According to still another aspect of the present invention, there is provided a computer-readable recording medium recording an access control program executed processor by an image forming apparatus. The image forming apparatus includes a processor, a communication interface for accessing Web addresses, and a memory for storing predetermined addresses. The access control program causes the processor to execute the steps of: determining whether the image forming apparatus is in a first state that access of the image forming apparatus is limited to the predetermined addresses or a second state that the image forming apparatus is permitted to access any addresses; determining whether a designated address is included in the predetermined addresses, when the image forming apparatus is in the first state; and giving to the communication interface permission to access the designated address, when the designated address is included in the predetermined addresses.

The present invention allows provision of an image forming apparatus that imposes a restriction on access to an external address via a network and permits access to a predetermined address, thereby improving the convenience thereof, an access control method in the image forming apparatus, and a computer-readable recording medium that records an access control program for controlling the access by the image forming apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 conceptually shows a data structure of first information stored in a memory.

FIG. 6 conceptually shows a data structure of second information stored in the memory.

FIG. 7 conceptually shows a data structure of an image table stored in the memory.

FIG. 18 conceptually shows details of data received from the server.

DESCRIPTION OF THE PREFERRED EMBODIMENTS

Figure 1:
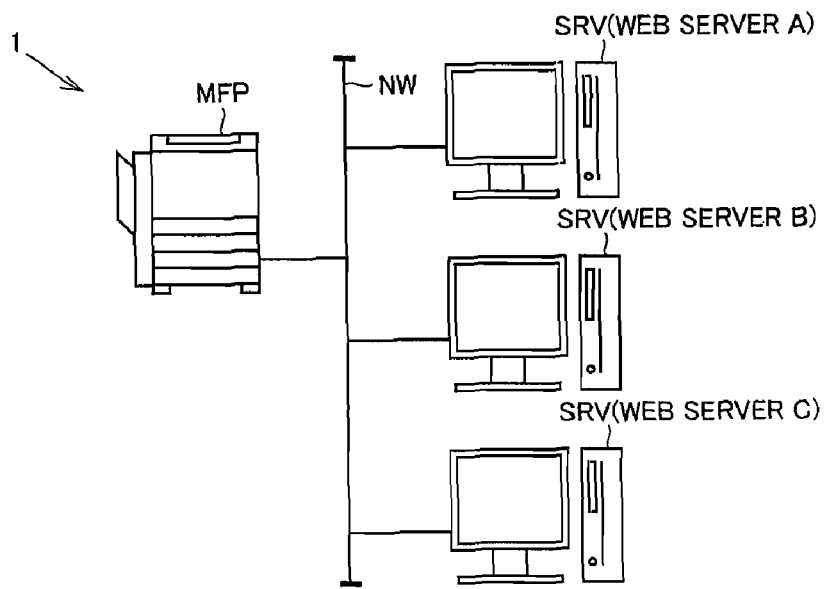
FIG. 1 shows a general configuration of an image forming system according to one embodiment of the present invention.

With reference to the drawings, hereinafter, detailed description will be given of preferred embodiments of the present invention. In the drawings, identical or corresponding components are denoted by a single reference symbol; therefore, description thereof will not be given repeatedly.

(General Configuration of Image Forming System)

FIG. 1 shows a general configuration of an image forming system 1 according to one embodiment of the present invention.

With reference to FIG. 1, image forming system 1 according to this embodiment includes an image forming apparatus MFP, and a server SRV connected to image forming apparatus MFP via a network NW.

Herein, server SRV and image forming apparatus MFP are configured to exchange data with each other. Network NW may be a dedicated line such as a LAN (Local Area Network) or a WAN (Wide Area Network). Alternatively, network NW may be a public line such as the Internet or a VPN (Virtual Private Network). Further, network NW may be partly or entirely a wireless communication line such as a wireless LAN.

In general, image forming apparatus MFP is an MFP (Multi Function Peripheral) having a plurality of functions such as a copier function, a facsimile function and a scanner function. In accordance with manipulations by a user, image forming apparatus MFP retrieves data from server SRV. That is, image forming apparatus MFP transmits, to server SRV, a request to acquire data. Image forming apparatus MFP executes an image forming process, based on the data acquired from server SRV. Herein, the image forming process involves print of data onto a paper medium, transmission of data by fax, and the like.

A right to access external server SRV and the like is given to image forming apparatus MFP. More specifically, a right to permit access to only a predetermined server SRV (a license for trial version), a right to impose no restriction on access to any external server SRV (a license for full version), a right to impose a restriction on access to all external servers SRV, and the like are given to image forming apparatus MFP. Herein, the license for trial version is given to image forming apparatus MFP in order that the user uses a Web browser function on trial. That is, image forming apparatus MFP having the license for trial version given thereto can access only a predetermined server SRV. Herein, the access right to be given to image forming apparatus MFP can be changed by a maintenance person (a service person).

Typically, server SRV is realized by an external Web server or the like. A predetermined address is allocated to server SRV in order to identify server SRV. Server SRV stores various kinds of contents data such as image data and text data. In accordance with a data transmission request from image forming apparatus MFP, server SRV generates contents data and transmits this contents data to image forming apparatus MFP. Image forming apparatus MFP according to this embodiment can be connected to a plurality of servers SRV (e.g., a Web server A, a Web server B, . . . ) via network NW such as the Internet.

Hereinafter, detailed description will be given of a configuration for realizing the functions described above.

(Hardware Configuration of Image Forming Apparatus MFP)

Figure 2:
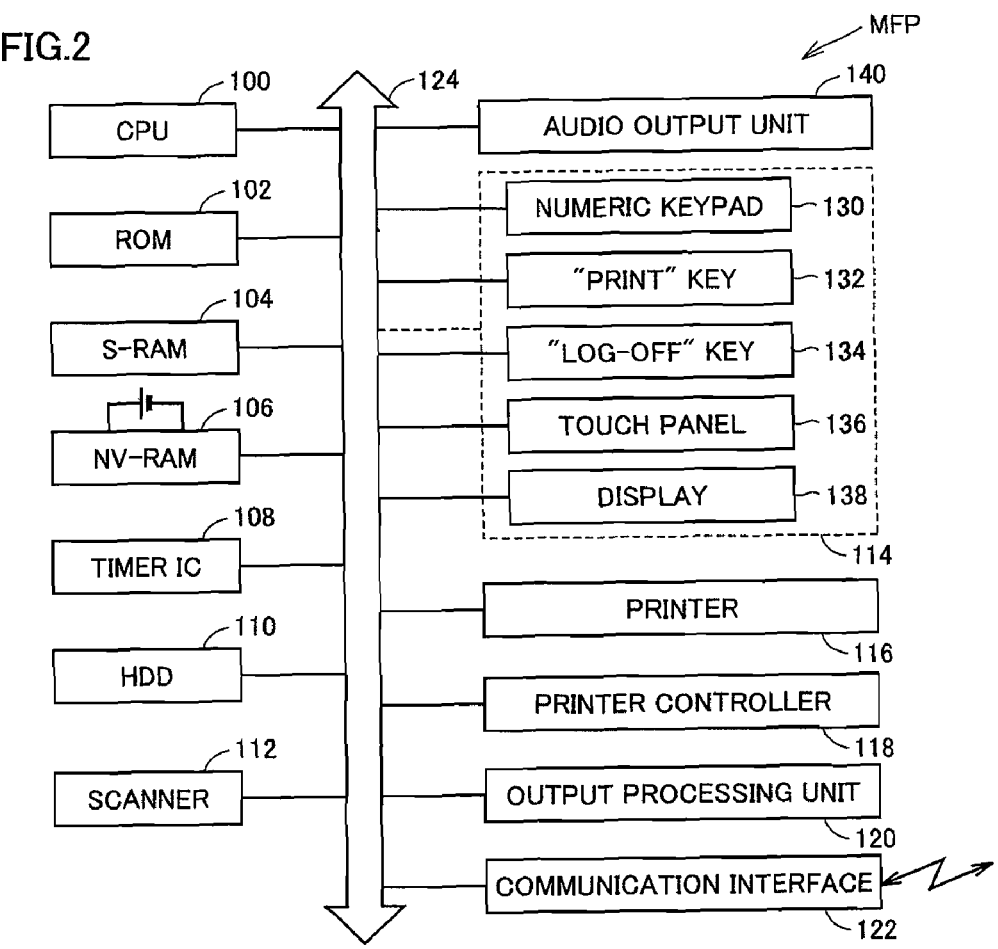
FIG. 2 schematically shows a hardware configuration of an image forming apparatus according to the embodiment of the present invention.

FIG. 2 schematically shows a hardware configuration of image forming apparatus MFP according to the embodiment of the present invention.

With reference to FIG. 2, image forming apparatus MFP includes a CPU (Central Processing Unit) 100, a ROM (Read Only Memory) 102, an S-RAM (Static-Random Access Memory) 104, an NV-RAM (Non-Volatile Random Access Memory) 106 and a timer IC (Integrated Circuit) 108. These components are connected to one another through a bus 124.

CPU 100 reads a program, which is stored previously in ROM 102 or the like, from ROM 102 onto S-RAM 104 serving as a working memory and executes the program to realize a process according to this embodiment. Moreover, NV-RAM 106 stores various settings concerning image formation in an MFP in a non-volatile manner. Timer IC 108 includes a quartz oscillator and the like, and measures a current time.

Image forming apparatus MFP also includes a scanner 112, an operating panel 114, a printer 116, a printer controller 118 and an output processing unit 120.

Scanner 112 is a component for realizing the scanner function, and scans a document to generate image data. In general, scanner 112 includes a mount table on which a document is placed, a platen glass, a feeder unit for automatically feeding documents placed on the mount table to the platen glass one by one, and a discharge tray for discharging a scanned document. These components are not shown in the figure.

Operating panel 114 includes a numeric keypad 130, a "print" key 132, a "log-off" key 134, a touch panel 136 and a display 138. Operating panel 114 is provided at an upper side of image forming apparatus MFP such that the user readily uses operating panel 114. Each of numeric keypad 130, "print" key 132, "log-off" key 134 and touch panel 136 functions as an input unit that accepts manipulations by the user. On the other hand, display 138 functions as a display that displays a screen for allowing the user to make various settings or to make choices. Display 138 is a liquid crystal panel, for example. Touch panel 136 is arranged on a display surface of display 138.

Printer 116 is a component for printing an image onto a paper medium or the like. Printer 116 includes an image forming unit that includes an exposure unit, a developing roller and the like, a transfer roller that transfers a toner image formed by the image forming unit onto a paper medium, a fuser that fuses the transferred toner image, a control circuit that controls operations of the respective components, and the like.

Printer controller 118 converts print data (conversion data) transmitted from a server SRV or a personal computer and image data obtained by a scan of scanner 112 to data suitable for a printing process in printer 116. Typically, in a case where image forming apparatus MFP is of a color type, printer controller 118 converts the print data (the conversion data) or the image data to raster data consisting of four colors, that is, yellow (Y), magenta (M), cyan (C) and black (K), and outputs the raster data of each color to printer 116.

Output processing unit 120 is a component for executing processes on a paper medium on which an image is formed by printer 116. Typically, output processing unit 120 executes a "sorting process", a "grouping process", a "stapling process", a "punching process" and the like. Herein, the "sorting process" means so-called collation print. The "grouping process" means a process of outputting a plurality of paper media, the count of which is set in advance, for each page of a relevant document. The "stapling process" means a process of stapling the outputted paper media. The "punching process" means a process of punching a hole in the outputted paper media.

Image forming apparatus MFP also includes a hard disk unit (HDD: Hard Disk Drive) 110 and a communication interface 122.

Hard disk unit 110 is a memory that stores a relatively large capacity of data in a non-volatile manner. For example, hard disk unit 110 stores conversion data transmitted from server SRV, image data obtained by a scan of scanner 112, and the like. Communication interface 122 is a component for establishing data communications with a personal computer or a server SRV via network NW.

An audio output unit 140 includes a loudspeaker and the like. Audio output unit 140 outputs a voice guidance, an alarm sound, and the like concerning a method of using image forming apparatus MFP, a function of image forming apparatus MFP, and the like.

(Hardware Configuration of Server SRV)

Figure 3:
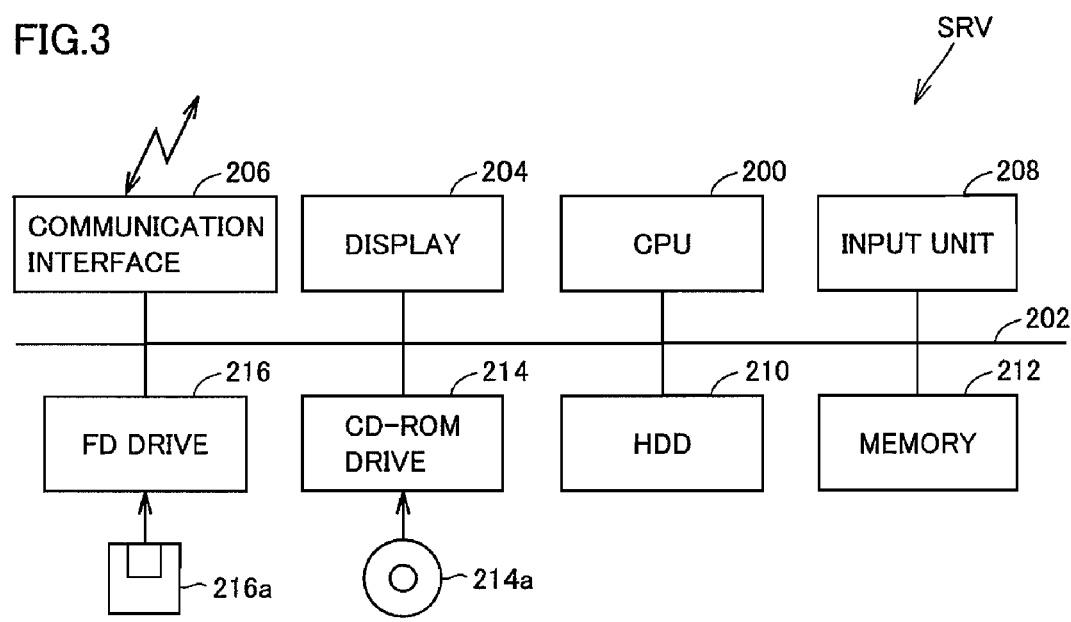
FIG. 3 schematically shows a hardware configuration of a server according to the embodiment of the present invention.

FIG. 3 schematically shows a hardware configuration of server SRV according to the embodiment of the present invention.

With reference to FIG. 3, server SRV includes a CPU 200 that executes various programs such as an operating system, a memory 212 that temporarily stores data required for execution of the program in CPU 200, and a hard disk unit 210 that stores the program executed by CPU 200 in a non-volatile manner. Herein, such a program is read from a CD-ROM (Compact Disk-Read Only Memory) 214a through a CD-ROM drive 214. Alternatively, such a program is read from an FD (Flexible Disk) 216a through an FD drive 216.

CPU 200 receives a manipulation request from a user through an input unit 208 such as a keyboard or a mouse, and outputs a screen output generated by execution of a program to a display 204. Moreover, CPU 200 establishes data communications with image forming apparatus MFP through a communication interface 206 such as a LAN card. Herein, these components are connected to one another through an internal bus 202.

Communication interface 206 receives data from image forming apparatus MFP via network NW. In accordance with data received from image forming apparatus MFP, CPU 200 reads data required by image forming apparatus MFP from hard disk unit 210, and allows communication interface 206 to transmit this data to image forming apparatus MFP. In accordance with data received from image forming apparatus MFP, moreover, CPU 200 allows hard disk unit 210 to store data, for example, data uploaded from image forming apparatus MFP. In accordance with data received from image forming apparatus MFP, further, CPU 200 updates hard disk unit 210, based on new data edited by the user of image forming apparatus MFP.

Next, detailed description will be given of a functional configuration of image forming apparatus MFP and various processing procedures in image forming apparatus MFP.

(Functional Configuration of Image Forming Apparatus MFP)

Figure 4:
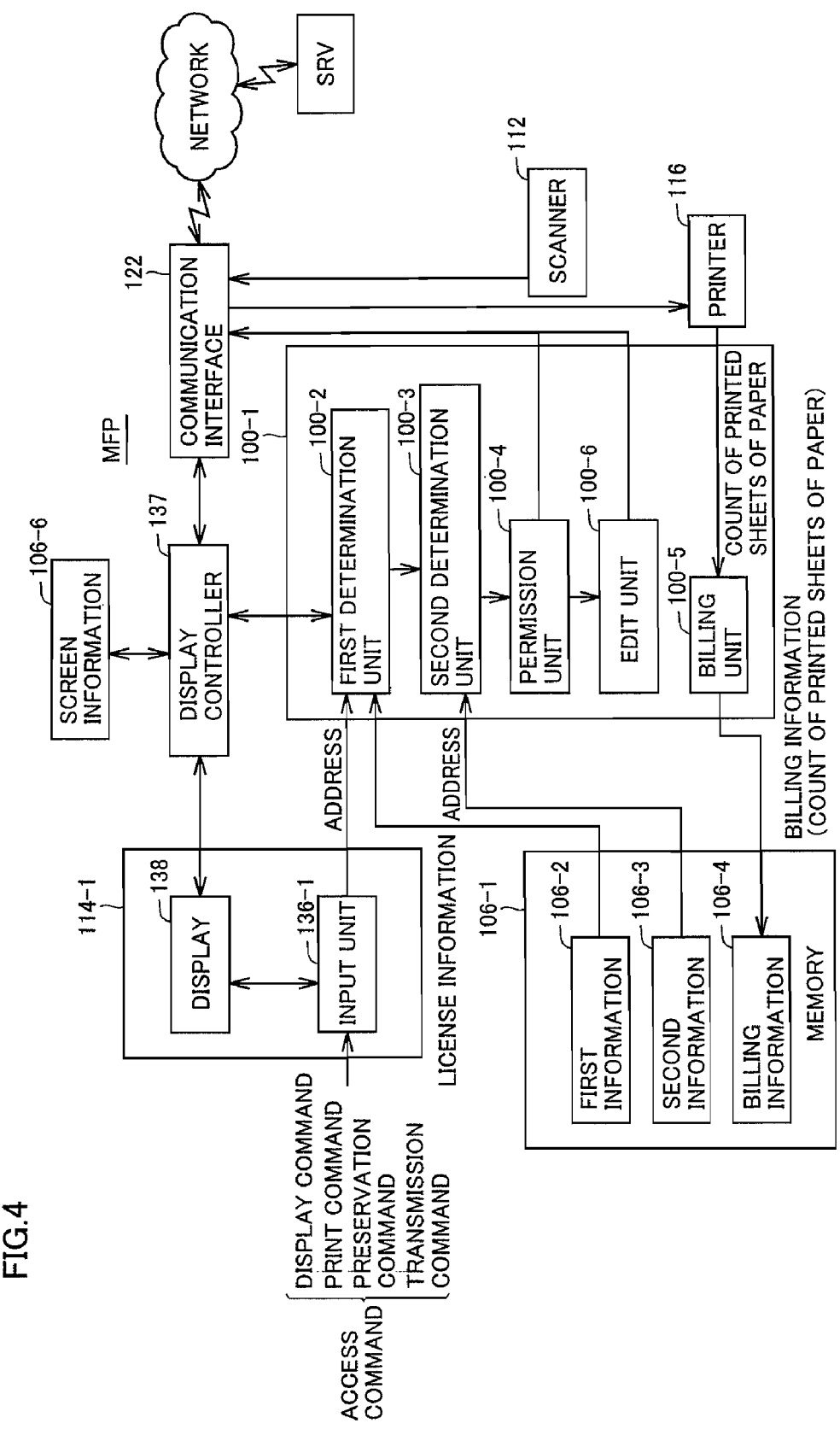
FIG. 4 is a block diagram showing a functional configuration of the image forming apparatus according to the embodiment of the present invention.

FIG. 4 is a block diagram showing the functional configuration of image forming apparatus MFP according to the embodiment of the present invention. With reference to FIG. 4, image forming apparatus MFP includes, as functions thereof, a display controller 137, a display 138, an input unit 136-1, a first determination unit 100-2, a second determination unit 100-3, a permission unit 100-4, a billing unit 100-5, an edit unit 100-6, a memory 106-1, scanner 112, printer 116 and a communication interface 122.

First determination unit 100-2, second determination unit 100-3, permission unit 100-4, billing unit 100-5 and edit unit 100-6 are realized in such a manner that CPU 100 reads programs, which are stored previously in ROM 102 and hard disk unit 110, from ROM 102 and hard disk unit 110 onto S-RAM 104 and executes these programs. In other words, first determination unit 100-2, second determination unit 100-3, permission unit 100-4, billing unit 100-5 and edit unit 100-6 correspond to the functions of processor 100-1 of image forming apparatus MFP. Moreover, memory 106-1 is formed on a predetermined region of NV-RAM 106 or hard disk unit 110.

Display 138 and input unit 136-1 are realized by operating panel 114. In this embodiment, display 138 and input unit 136-1 form a display and input unit 114-1. More specifically, display 138 displays an image based on data received from an external address (e.g., server SRV) via network NW by communication interface 122.

Input unit 136-1 is realized by numeric keypad 130, "print" key 132, "log-off" key 134, touch panel 136 and the like. Moreover, input unit 136-1 accepts various settings concerning a printing operation, and an access command including an external address. Herein, examples of the access command including the external address include a display command for displaying information about the address, a printing command for printing out the information, a preservation command for preserving the information, a transmission command for uploading the information onto the address, an edit command for editing data stored in the address, and the like.

Access to an external address means a state that an image forming apparatus MFP accesses an external server SRV on a network such as the Internet. Herein, the access to an external address involves upload of data from an image forming apparatus MFP to a server SRV, and download of data from server SRV to image forming apparatus MFP.

Memory 106-1 stores first information (license information) 106-2 indicating a right to access an external address, and second information 106-3 containing at least one predetermined address. Memory 106-1 also stores billing information 106-4 containing a count of sheets of paper printed by printer 116, a use charge of an image forming apparatus based on the count of printed sheets of paper, and the like. Memory 106-1 also stores an image table 106-5 including a predetermined external address holding image data and the like (see FIG. 7). Memory 106-1 also stores screen information 106-6 (upper side in FIG. 4) for displaying a menu or a Web browser on display 138.

FIG. 5 conceptually shows a data structure of first information 106-2 stored in memory 106-1. In image forming apparatus MFP according to this embodiment, a right to access an external address, that is, at least one of (a) a state that a license for full version is given to image forming apparatus MFP (second state), (b) a state that a license for trial version is given to image forming apparatus MFP (first state) and (c) a state that no license is given to image forming apparatus MFP (third state) is set as first information 106-2. That is, memory 106-1 stores first information 106-2 indicating a type of an access right to be given to the user of image forming apparatus MFP.

In order to store first information 106-2, for example, memory 106-1 has a region for storing a type of license information such as an access right and a region for storing an expiration date of the access right. Alternatively, memory 106-1 has flag regions provided in correspondence with the respective access rights. When a flag corresponding to a certain access right is set, this access right is given to image forming apparatus MFP.

In the case where the license for full version is given to image forming apparatus MFP (state (a)), image forming apparatus MFP can access all external addresses. In the case where the license for trial version is given to image forming apparatus MFP (state (b)), image forming apparatus MFP is permitted to access only a predetermined address (an address of predetermined server SRV) contained in second information 106-3. In the case where no license is given to image forming apparatus MFP (state (c)), image forming apparatus MFP can not access any external address.

Details of first information 106-2 stored in memory 106-1 can be changed by a maintenance person (a service person). Specifically, the maintenance person enters a special password for maintenance into image forming apparatus MFP to change (update) the details of first information 106-2 stored in memory 106-1.

With reference to FIG. 4 again, in accordance with an access command containing an external address, first determination unit 100-2 refers to first information 106-2 to determine whether first information 106-2 indicates the first state, that is, whether to permit access to only a predetermined address. More specifically, when input unit 136-1 accepts an access command containing an external address such as a display command, first determination unit 100-2 refers to first information 106-2 in memory 106-1.

In accordance with an access command containing an external address, moreover, first determination unit 100-2 refers to first information 106-2 to determine whether first information 106-2 indicates the second state, that is, whether to permit access to all addresses. In accordance with an access command containing an external address, further, first determination unit 100-2 refers to first information 106-2 to determine whether first information 106-2 indicates the third state, that is, whether to prohibit access to all the addresses.

In accordance with a transmission command for uploading image data onto an external address, for example, first determination unit 100-2 refers to first information 106-2 to determine whether first information 106-2 indicates the first state, that is, whether to permit upload of image data onto only a predetermined address. In accordance with a transmission command for uploading image data onto an external address, moreover, first determination unit 100-2 refers to first information 106-2 to determine whether first information 106-2 indicates the second state, that is, whether to permit access to all the addresses.

In accordance with an edit command for editing data stored in an external address, for example, first determination unit 100-2 refers to first information 106-2 to determine whether first information 106-2 indicates the first state, that is, whether to permit an edit for only data stored in a predetermined address. In accordance with an edit command for editing data stored in an external address, moreover, first determination unit 100-2 refers to first information 106-2 to determine whether first information 106-2 indicates the second state, that is, whether to permit an edit for data stored in all the addresses.

FIG. 6 conceptually shows a data structure of second information 106-3 stored in memory 106-1. As shown in FIG. 6, memory 106-1 stores a predetermined address (an address of a predetermined server SRV) which can be accessed by image forming apparatus MFP in a case where the license for trial version is given to image forming apparatus MFP (in a case where first information 106-2 indicates the first state). More specifically, memory 106-1 previously stores, as a predetermined address, at least one URL which can be accessed by image forming apparatus MFP to which the license for trial version is given.

FIG. 7 conceptually shows a data structure of image table 106-5 stored in memory 106-1. As shown in FIG. 7, memory 106-1 stores a predetermined address (a folder address or a file address of a predetermined server SRV) which stores image data and can be accessed by image forming apparatus MFP in a case where the license for trial version is given to image forming apparatus MFP (in a case where first information 106-2 indicates the first state). Image table 106-5 is used only in a case where first information 106-2 stored in NV-RAM 106 indicates the license for trial version. Image table 106-5 previously stores URL information indicating a position of an image file on which image forming apparatus MFP is permitted to perform pull print and the like.

With reference to FIG. 4 again, in a case where image forming apparatus MFP is permitted to access data in only a predetermined address, that is, in a case where the license for trial version is given as first information 106-2 to image forming apparatus MFP (in a case where first information 106-2 indicates the first state), second determination unit 100-3 refers to second information 106-3 to determine whether an external address contained in an access command is included in the predetermined addresses which are set previously.

For example, in a case where image forming apparatus MFP is permitted to upload data onto only a predetermined address, that is, in the case where the license for trial version is given as first information 106-2 to image forming apparatus MFP (in the case where first information 106-2 indicates the first state), second determination unit 100-3 refers to second information 106-3 to determine whether an external address contained in a transmission command is included in the predetermined addresses.

Moreover, in a case where image forming apparatus MFP is permitted to edit only data stored in a predetermined address, that is, in the case where the license for trial version is given as first information 106-2 to image forming apparatus MFP (in the case where first information 106-2 indicates the first state), second determination unit 100-3 refers to second information 106-3 to determine whether an external address contained in an edit command is included in the predetermined addresses.

In the case where image forming apparatus MFP is permitted to access only the predetermined address (in the case where first information 106-2 indicates the first state), when an external address contained in an access command (an address required by an access command) is included in the predetermined addresses, permission unit 100-4 permits communication interface 122 to access the external address. Likewise, in the case where image forming apparatus MFP is permitted to access only the predetermined addresses, when the external address contained in the access command is not included in the predetermined addresses, permission unit 100-4 prohibits communication interface 122 from accessing the external address. Moreover, in the case where image forming apparatus MFP is permitted to access all the addresses (in the case where first information 106-2 indicates the second state), permission unit 100-4 permits communication interface 122 to access all the external addresses.

For example, in the case where image forming apparatus MFP is permitted to access only the predetermined addresses (in the case where first information 106-2 indicates the first state), when the external address contained in the access command is included in the predetermined addresses, permission unit 100-4 permits communication interface 122 to upload data onto the external address. Moreover, in the case where image forming apparatus MFP is permitted to access all the addresses (in the case where first information 106-2 indicates the second state), permission unit 100-4 permits communication interface 122 to upload data onto all the external addresses.

For example, in the case where image forming apparatus MFP is permitted to access only the predetermined addresses (in the case where first information 106-2 indicates the first state), when the external address contained in the access command is included in the predetermined addresses, permission unit 100-4 permits communication interface 122 to edit data stored in the external address. Moreover, in the case where image forming apparatus MFP is permitted to access all the addresses (in the case where first information 106-2 indicates the second state), permission unit 100-4 permits communication interface 122 to edit data stored in all the external addresses.

When printer 116 performs a printing operation, billing unit 100-5 keeps a count of printed sheets of paper. However, in the case where image forming apparatus MFP is permitted to access only the predetermined addresses, if printer 116 performs the printing operation on an image based on data from the predetermined address, billing unit 100-5 does not keep a count of printed sheets of paper.

In accordance with an edit command for editing data of an external address inputted to input unit 136-1, edit unit 100-6 performs an editing process on image data and text data, each of which is uploaded onto the external address, through communication interface 122. In accordance with the edit command, more specifically, edit unit 100-6 sends a request to edit image data to the external address through communication interface 122.

Communication interface 122 accesses an external address (e.g., server SRV) via network NW. That is, when permission unit 100-4 permits access to an external address, communication interface 122 sends a transmission request and an edit request to the external address.

Printer 116 performs the printing operation on an image, based on data received from an external address. When printer 116 performs the printing operation, billing unit 100-5 keeps a count of printed sheets of paper to update billing information 106-4 stored in memory 106-1.

Scanner 112 scans an image to acquire image data. The image data read by scanner 112 is stored in hard disk unit 110 or is transmitted to server SRV through communication interface 122.

Figure 8:
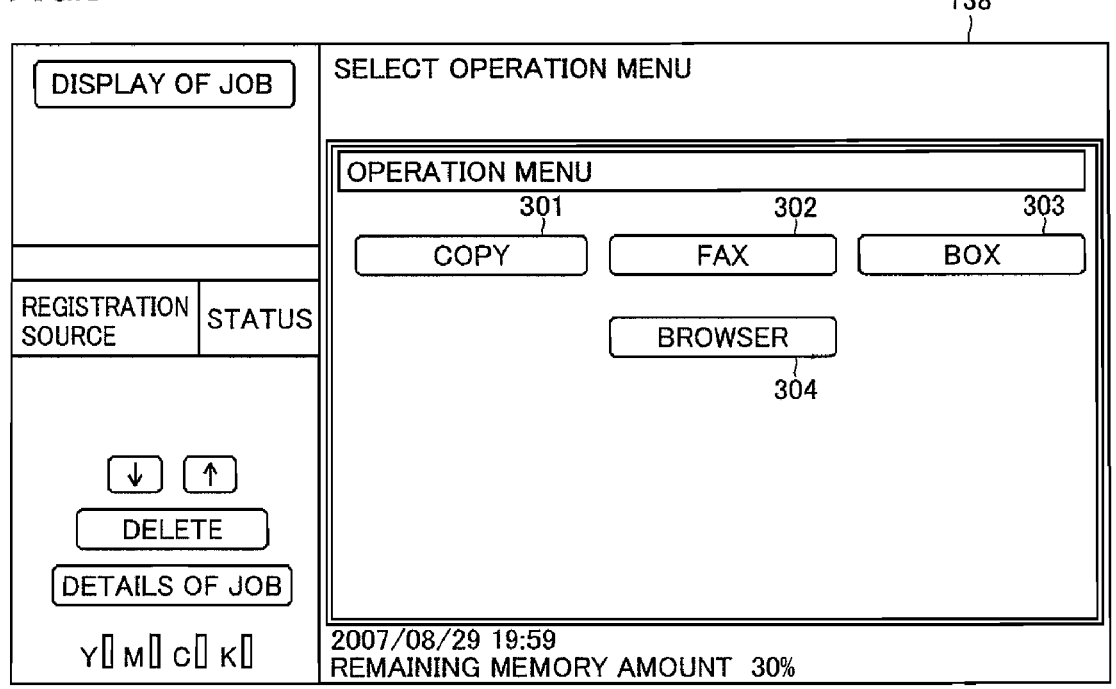
FIG. 8 conceptually shows an operation menu displayed on a display.

FIG. 8 conceptually shows an operation menu displayed on display 138. As shown in FIG. 8, display 138 displays a "copy" icon 301 for transition to a setting screen for utilizing a copier function, a "fax" icon 302 for transition to a setting screen for utilizing a facsimile function, a "box" icon 303 for transition to a setting screen for utilizing a box function (a function of storing data in hard disk unit 110), and a "browser" icon 304 for transition to a screen for utilizing a browser function.

Herein, "browser" icon 304 is displayed in a case where CPU 100 acquires first information 106-2 stored in NV-RAM 106 and the license for full version or the license for trial version is given to image forming apparatus MFP. For example, CPU 100 or display controller 137 realized by a control program reads screen information 106-6 from memory 106-1, and allows display 138 to display the operation menu shown in FIG. 8.

More specifically, based on coordinates on touch panel 136 touched by the user, CPU 100 reads a function corresponding to the coordinates of the touched portion from S-RAM 104 to execute a control program for implementing the function. CPU 100 recognizes that the user enters a browser activation command through touch panel 136, and acquires first information 106-2 from NV-RAM 106. In a case where the license for trial version is set, CPU 100 activates a browser for trial version. On the other hand, in a case where the license for full version is set, CPU 100 activates a browser for full version.

Figure 9:
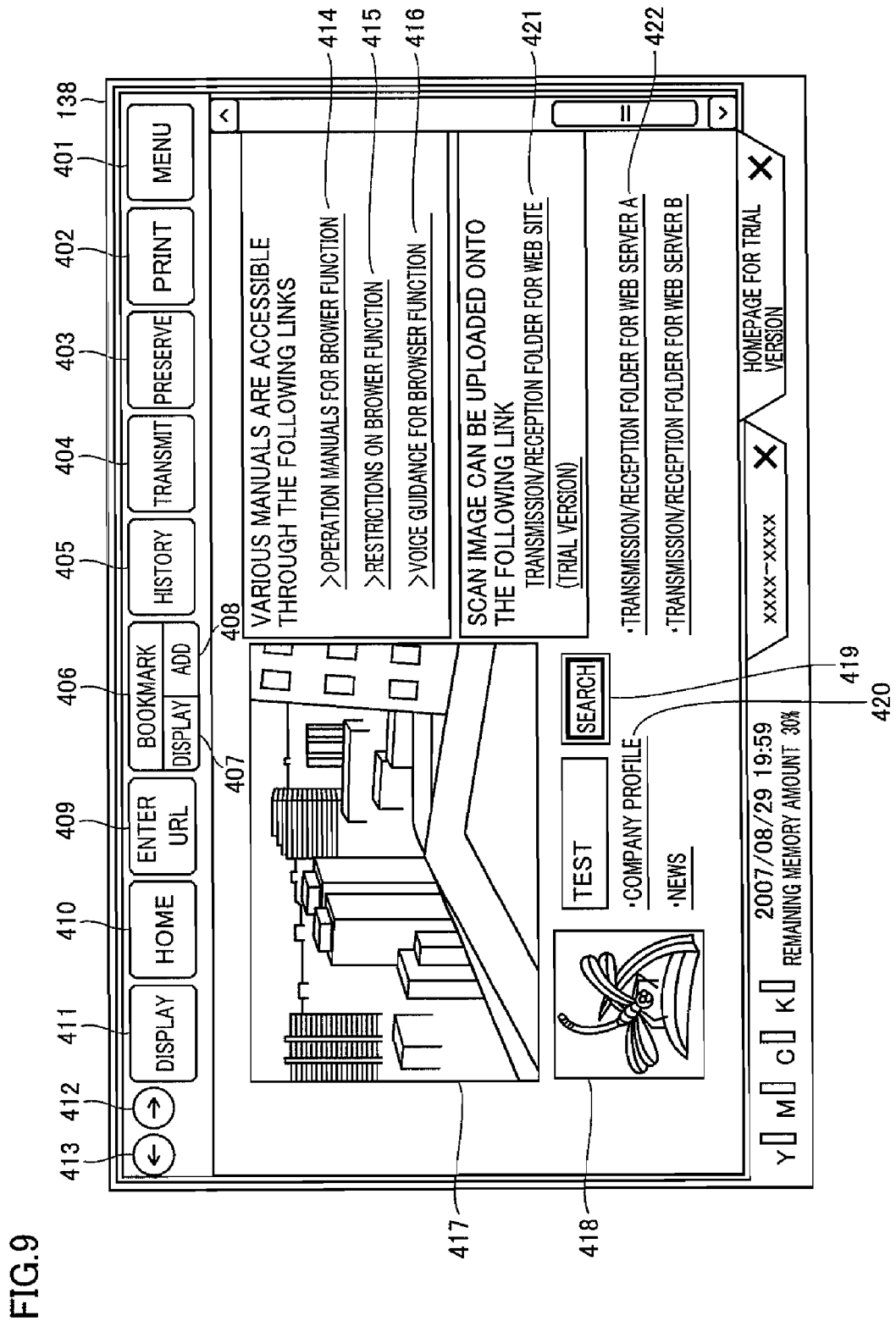
FIG. 9 conceptually shows the display on activation of a browser.

In the following, description will be given of a case where the user touches "browser" icon 304 in order to utilize the browser function. FIG. 9 conceptually shows display 138 upon activation of a Web browser. CPU 100 activates a browser, based on a program read onto S-RAM 104. Thereafter, CPU 100 determines that an execution command given thereto is a command to display an initial screen of the browser, and reads a homepage address from NV-RAM 106 to display an initial screen of the Web browser shown in FIG. 9.

For example, CPU 100 or display controller 137 realized by the control program reads screen information 106-6 from memory 106-1, and allows display 138 to display the Web browser shown in FIG. 9. More specifically, display controller 137 allows display 138 to display the Web browser shown in FIG. 9, based on image data of various buttons contained in screen information 106-6, display positions of the respective buttons, data about a homepage downloaded from server SRV, and the like. Thus, display controller 137 reads screen information 106-6 from memory 106-1, extracts image data of each button, text data of link information, and a display position of each data from screen information 106-6, and allows display 138 to display images of the various buttons and link information at relevant positions, respectively.

Display 138 displays, at a horizontally central upper side thereof, a URL input button 409. However, if CPU 100 acquires the license for trial version from NV-RAM 106, a typical user fails to enter a URL. Therefore, no event occurs even when a user touches URL input button 409.

Display 138 also displays, at the horizontally central upper side thereof, a display button 407 for a bookmark 406. When the user touches bookmark display button 407, CPU 100 allows display 138 to display a title of a Web page having a predetermined address (a bookmark address) which is preserved in NV-RAM 106 and is similar to those shown in FIG. 6. Herein, the bookmark means information for accessing a specific Web page (e.g., URL information), and the user previously registers such a bookmark in image forming apparatus MFP. In a case where image forming apparatus MFP accesses the Web page again, image forming apparatus MFP can readily access this Web page only by reading the bookmark registered therein.

Display 138 also displays, at the horizontally central upper side thereof, an addition button 408 for bookmark 406. When the user touches addition button 408, a title and URL information of a Web page displayed currently are registered in the predetermined address shown in FIG. 6. The bookmark address may be stored as second information 106-3. Alternatively, the bookmark address may be stored in memory 106-1 independently of second information 106-3.

Display 138 also displays, at a vertically central right side thereof, URL information of a linked Web page which can be displayed with the license for trial version. Herein, examples of the URL information of the linked Web page include link information 414 of an address from which the user can acquire information about an operation manual concerning the browser function, link information 415 of an address from which the user can acquire information about restrictions, and the like. The URL information of the linked Web page which can be displayed corresponds to the information stored as second information 106-3 in memory 106-1. For example, in a case where the user selects link information 414 of the address from which he/she can acquire the information about the operation manual and then touches display button 411, when the address of link information 414 of the operation manual matches with the URL contained in second information 106-3, display 138 can display contents of link information 414 of the operation manual.

Display 138 also displays, at a lower right side thereof, URL information of a linked Web page in a folder which is protected from access (data transmission/reception) by image forming apparatus MFP to which the license for trial version is given. Herein, examples of the URL information include link information 422 of a folder for Web server A, and the like. The URL information of the linked Web page in the inaccessible folder corresponds to URL information which is not contained in second information 106-3 shown in FIG. 6. For example, even in a case where the user selects link information 422 of the folder stored in Web server A and then touches a transmission button 404, when the URL information of link information 422 of the folder stored in Web server A does not match with any URL information contained in second information 106-3 as a result of comparison by CPU 100, CPU 100 executes no transmitting process. That is, since communication interface 122 is prohibited from accessing an external address, no event occurs even when the user touches transmission button 404.

<Displaying Process>

Figure 10:
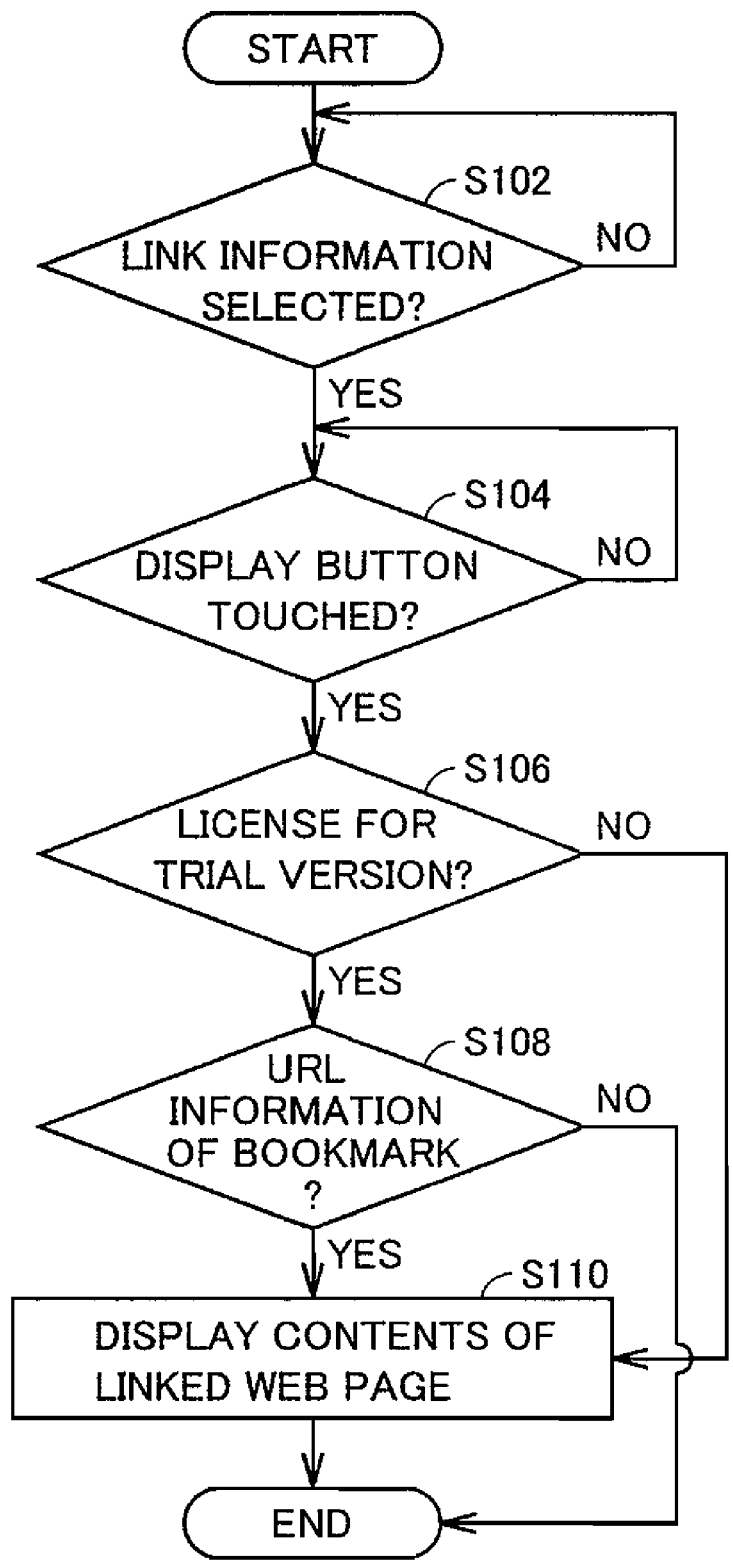
FIG. 10 is a flowchart showing a procedure of an image displaying process in the image forming apparatus.

FIG. 10 is a flowchart showing a procedure of an image displaying process in image forming apparatus MFP. As shown in FIGS. 9 and 10, for example, when the user selects link information 414 of the operation manual on display 138 (YES in step S102) and then touches display button 411 on display 138 (YES in step S104), CPU 100 reads a function (a control program) corresponding to coordinates of the portion touched by the user from S-RAM 104 and acquires an execution command for executing the function (the control program).

More specifically, CPU 100 determines that the execution command indicates display of a linked Web page, acquires first information 106-2 from NV-RAM 106, and determines whether the license for trial version is given to image forming apparatus MFP (step S106). That is, CPU 100 acquires first information 106-2 from NV-RAM 106 and determines whether the license for trial version is set.

When the license for trial version is set (YES in step S106), CPU 100 compares the URL information contained in second information 106-3 preserved in NV-RAM 106 with URL information of the linked Web page which is requested by the user (step S108).

On the other hand, when the license for full version rather than the license for trial version is set (NO in step S106), display 138 displays contents of the linked Web page (step S110).

When the license for trial version is set (YES in step S106) and the URL information of the linked Web page which is requested by the user matches with any URL information contained in second information 106-3 (YES in step S108), display 138 displays the contents of the linked Web page (step S110). When the URL information of the linked Web page does not match with any URL information, CPU 100 completes the displaying process without accessing the linked Web page. That is, the screen on display 138 is not changed even when the user touches display button 411.

<Printing Process>

With reference to FIG. 9 again, display 138 also displays, at a vertically central left side thereof, URL information of a linked Web page which can be printed out with the license for trial version, such as a scenic image 417. Display 138 also displays, at the vertically central right side thereof, URL information of a linked Web page which can be printed out with the license for trial version, such as link information 415 of restrictions. The URL information of the linked Web page which can be printed out corresponds to the URL information contained in second information 106-3 shown in FIG. 6 or the URL information registered in image table 106-5 shown in FIG. 7. For example, when the user selects scenic image 417 and then touches a print button 402, CPU 100 determines whether URL information of scenic image 417 matches with any URL contained in second information 106-3 or any URL information registered in image table 106-5. When the URL information of scenic image 417 matches with any URL information contained in second information 106-3 or any URL information registered in image table 106-5, communication interface 122 accesses the linked Web page which is requested by the user, and printer 116 prints out contents of scenic image 417.

Display 138 also displays, at a lower left side thereof, URL information of a linked Web page which can not be printed out in a case where the license for trial version is set, such as a dragonfly image 418 and link information 420 of a company profile. Herein, the URL information of the linked Web page which can not be printed out corresponds to URL information which is not contained in second information 106-3 shown in FIG. 6 or URL information which is not registered in image table 106-5 shown in FIG. 7. For example, when the user selects dragonfly image 418 and then touches print button 402, CPU 100 compares URL information of dragonfly image 418 with the URL information contained in second information 106-3 or the URL information registered in image table 106-5. When the URL information of dragonfly image 418 does not match with any URL information contained in second information 106-3 or any URL information registered in image table 106-5, communication interface 122 fails to access the external address, and printer 116 fails to print out contents of dragonfly image 418.

Figure 11:
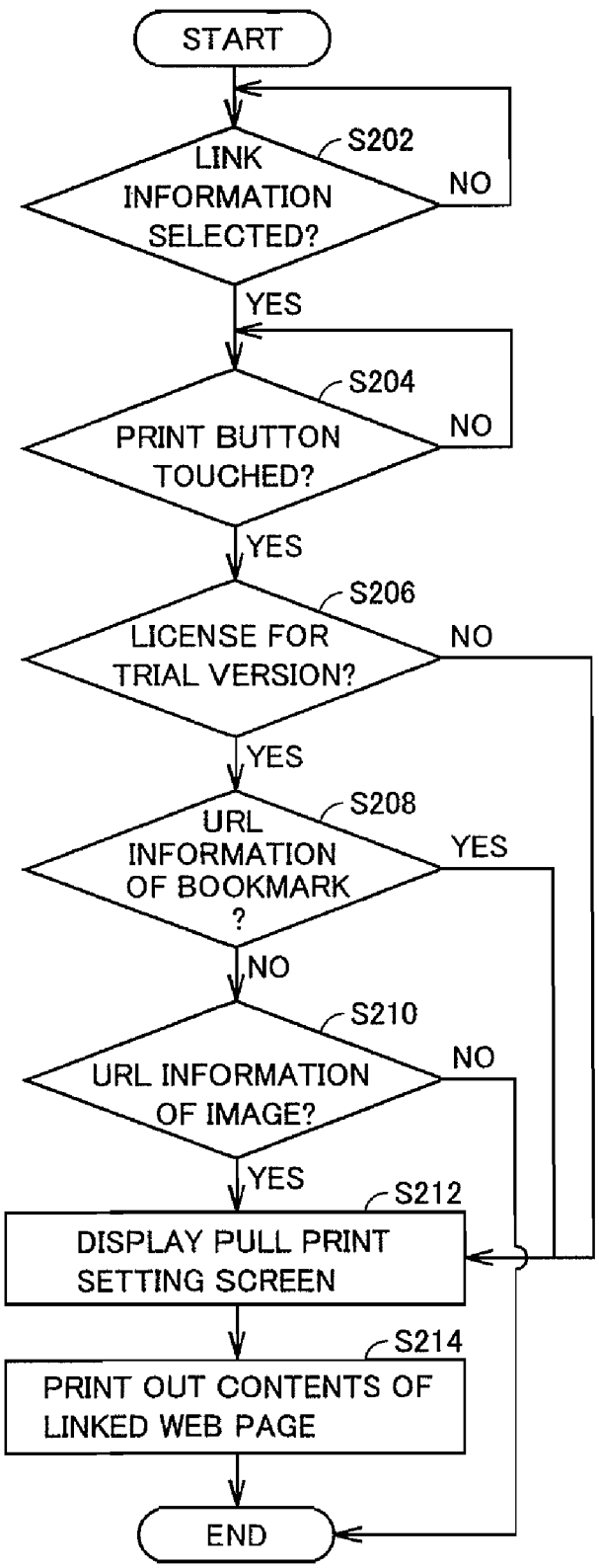
FIG. 11 is a flowchart showing a procedure of a printing process in the image forming apparatus.

FIG. 11 is a flowchart showing a procedure of a printing process in image forming apparatus MFP. As shown in FIGS. 9 and 11, when the user selects link information 414 of the operation manual on display 138 (YES in step S202) and then touches print button 402 on display 138 (YES in step S204), CPU 100 reads a function (a control program) corresponding to coordinates of the portion touched by the user from S-RAM 104 and acquires an execution command for executing the function (the control program).

More specifically, CPU 100 determines that the execution command indicates print of a linked Web page, acquires first information 106-2 from NV-RAM 106, and determines whether the license for trial version is given to image forming apparatus MFP (step S206).

When the license for trial version is set (YES in step S206), CPU 100 compares the URL information contained in second information 106-3 preserved in NV-RAM 106 with URL information of the linked Web page which is requested by the user (step S208).

On the other hand, when the license for full version rather than the license for trial version is set (NO in step S206), display 138 displays a pull print setting screen (step S212) and printer 116 prints out contents of the linked Web page (step S214).

When the license for trial version is set (YES in step S206) and the URL information of the linked Web page matches with any URL information contained in second information 106-3 (YES in step S208), display 138 displays the pull print setting screen and accepts print settings from the user (step S212). After completion of the print settings, printer 116 prints out the contents of the linked Web page (step S214).

When the URL information of the linked Web page does not match with any URL information contained in second information 106-3 (NO in step S208), CPU 100 determines whether the URL information of the linked Web page matches with the URL information registered in image table 106-5 (step S210). When the URL information of the linked Web page matches with any URL information registered in image table 106-5 (YES in step S210), display 138 displays the pull print setting screen and accepts the print settings from the user (step S212). After completion of the print settings, printer 116 prints out the contents of the linked Web page (step S214).

On the other hand, when the URL information of the linked Web page does not match with any URL information registered in image table 106-5 (NO in step S210), communication interface 122 fails to access the external address and printer 116 fails to perform the printing operation. That is, image forming apparatus MFP does not execute the printing process even when the user touches print button 402.

Figure 12:
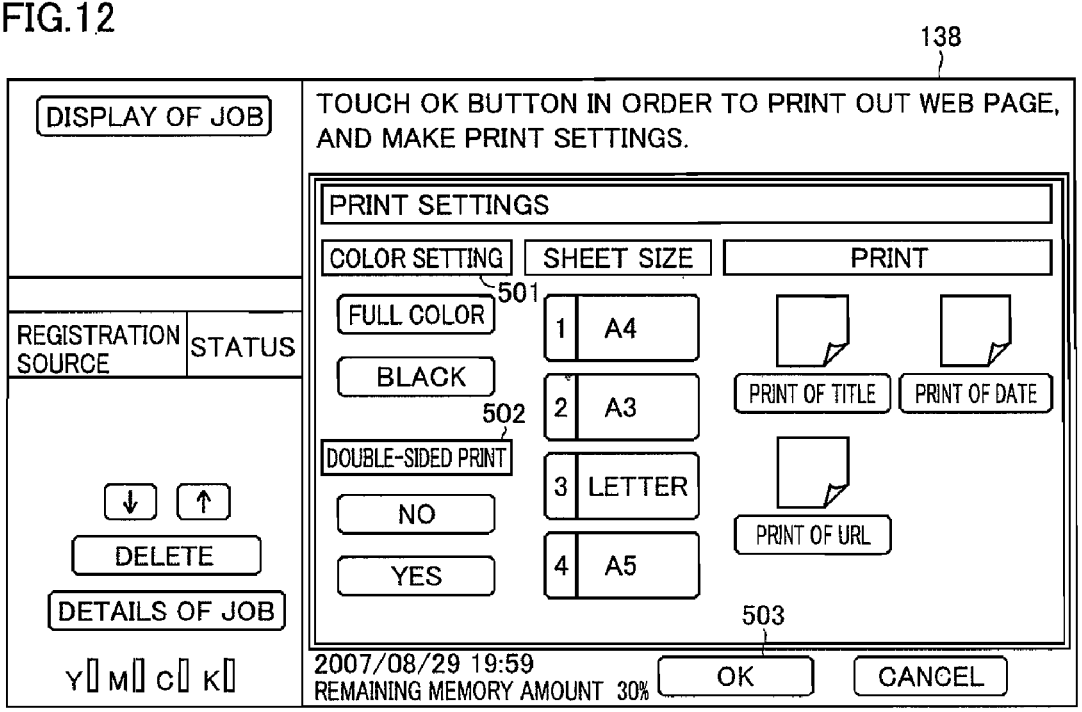
FIG. 12 conceptually shows a pull print setting screen displayed on the display.

FIG. 12 conceptually shows the pull print setting screen on display 138. As shown in FIG. 12, in the print settings, the user can select full color print or monochromatic print on the pull print setting screen. In the print settings, moreover, the user can select a size of a sheet of paper to be printed on the pull print setting screen. In addition, display 138 accepts, from the user, a setting about double-sided print, a setting about print of a title, a setting about print of a time, and the like.

Figure 13:
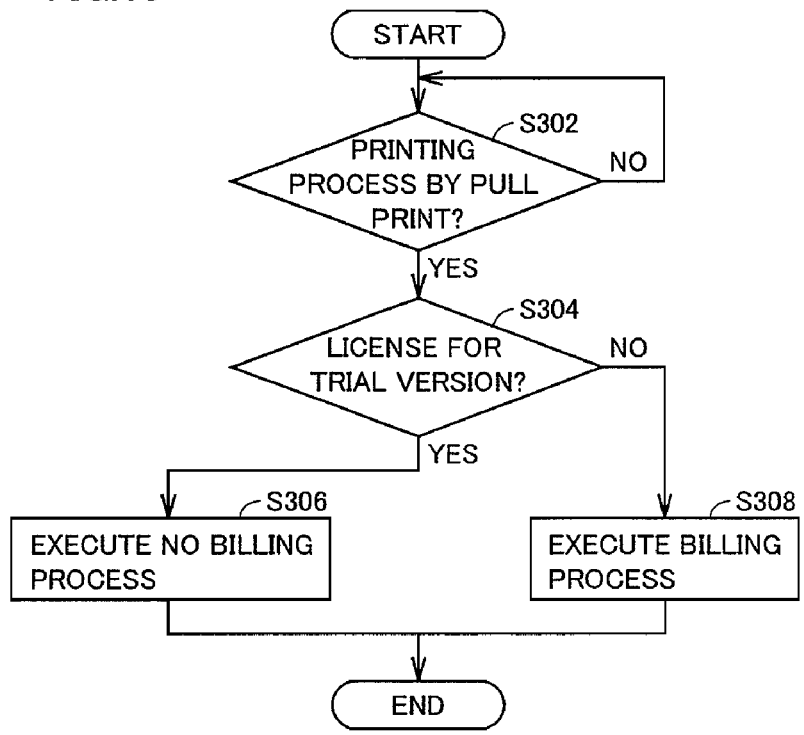
FIG. 13 is a flowchart showing a procedure of a billing process executed after execution of the printing process.

FIG. 13 is a flowchart showing a procedure of a billing process to be executed after execution of the printing process. As shown in FIGS. 12 and 13, when the user makes various print settings and then touches OK button 503, communication interface 122 receives a relevant Web page from server SRV. Next, printer controller 118 adds various kinds of print setting information to print data such as image data, and converts the print data to bitmap data. Printer 116 prints out the bitmap data in accordance with the various kinds of print setting information (YES in step S302).

When the printed sheet of paper is discharged normally, CPU 100 acquires first information 106-2 from NV-RAM 106 and determines whether the license for trial version is set (step S304). When the license for trial version is set (YES in step S304), CPU 100 does not keep the count of printed sheets of paper, that is, CPU 100 does not update the count of printed sheets of paper in NV-RAM 106 (step S306). In other words, when the license for trial version is set (YES in step S304), CPU 100 does not execute the billing process (step S306).

On the other hand, when the license for full version is set (NO in step S304), CPU 100 keeps the count of printed sheets of paper, that is, CPU 100 updates the count of printed sheets of paper in NV-RAM 106 (step S308). In other words, CPU 100 executes the billing process (step S308). Herein, the term "billing" means an operation of updating a use fee based on a count of printed sheets of paper in a case where a user obtains a print through use of image forming apparatus MFP. Herein, a use history of image forming apparatus MFP for each predetermined period is utilized for calculating a lease fee or a rental fee, for example.

<Transmitting Process>

With reference to FIG. 9 again, display 138 also displays, at the vertically central right side thereof, URL information of a linked Web page in a folder to/from which image forming apparatus MFP can transmit/receive data, such as link information 421 of a Web site transmission/reception folder. Herein, FIG. 9 shows an example of a case where the license for trial version is set. The URL information of the linked Web page in the folder to/from which image forming apparatus MFP can transmit/receive data corresponds to the URL information contained in second information 106-3 shown in FIG. 6. For example, when the user selects link information 421 of the Web site transmission/reception folder and then touches transmission button 404, CPU 100 compares URL information of link information 421 of the Web site transmission/reception folder with the URL information contained in second information 106-3. When the URL information of link information 421 of the Web site transmission/reception folder matches with any URL information contained in second information 106-3, image forming apparatus MFP can transmit a file of a scanned image to a folder of link information 421 of the Web site transmission/reception folder.

Figure 14:
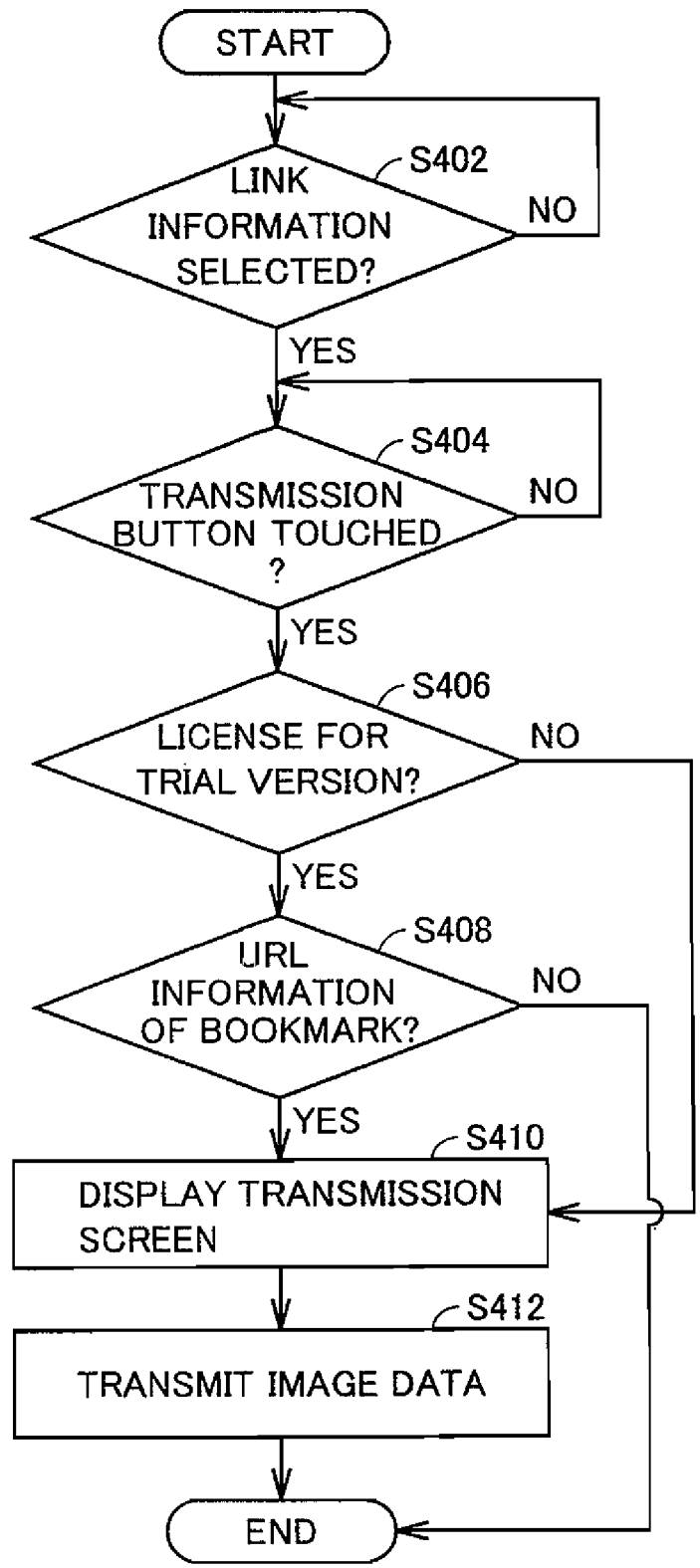
FIG. 14 is a flowchart showing a procedure of a transmitting process in the image forming apparatus.

FIG. 14 is a flowchart showing a procedure of the transmitting process in image forming apparatus MFP. As shown in FIGS. 9 and 14, when the user selects link information 421 of the Web site transmission/reception folder on display 138 (YES in step S402) and then touches transmission button 404 on display 138 (YES in step S404), CPU 100 reads a function (a control program) corresponding to coordinates of the portion touched by the user from S-RAM 104 and acquires an execution command for executing the function (the control program).

More specifically, CPU 100 determines that the execution command indicates data transmission to a transmission/reception folder for a linked Web page, acquires first information 106-2 from NV-RAM 106, and determines whether the license for trial version is set (step S406).

When the license for trial version is set (YES in step S406), CPU 100 compares the URL information contained in second information 106-3 preserved in NV-RAM 106 with the URL information of the linked Web page in the transmission/reception folder (step S408).

On the other hand, when the license for full version rather than the license for trial version is set (NO in step S406), display 138 displays a scan and transmission screen (step S410) and communication interface 122 transmits image data (step S412).

When the license for trial version is set (YES in step S406) and the URL information of the linked Web page matches with any URL information contained in second information 106-3 (YES in step S408), display 138 displays the scan and transmission screen and accepts transmission settings (step S410). After the user makes the transmission settings, communication interface 122 transmits the image data (step S412). When the URL information of the linked Web page does not match with any URL information contained in second information 106-3 (NO in step S408), communication interface 122 fails to access the external address. That is, image forming apparatus MFP does not execute the transmitting process even when the user touches transmission button 404.

Figure 15:
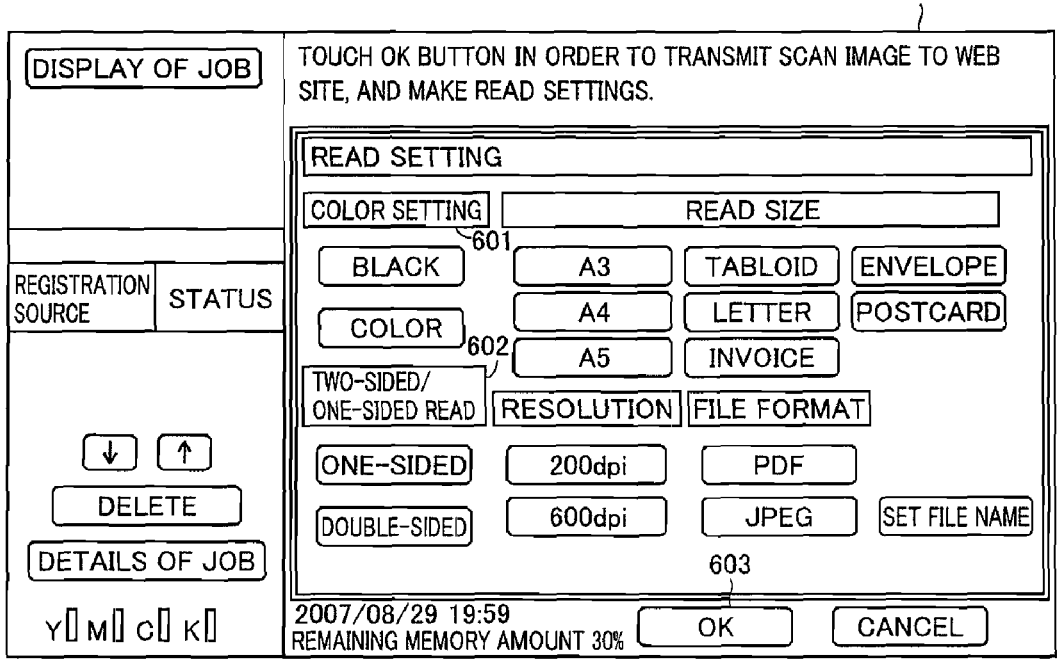
FIG. 15 conceptually shows a transmission setting screen displayed on the display.

FIG. 15 conceptually shows a transmission setting screen on display 138. As shown in FIG. 15, in a case where the user issues a transmission instruction on the scan and transmission screen, display 138 accepts various transmission settings such as a color setting 601 and a double-sided/one-sided read setting 602. When the user makes the various transmission settings and then touches an OK button 603, scanner 112 reads a document. CPU 100 expands image data to S-RAM 103, communication interface 122 transmits the image data to a folder for a relevant Web site, and display 138 displays a message about completion of the transmission (step S412).

<Preserving Process>

With reference to FIG. 9 again, display 138 also displays, at the vertically central right side thereof, URL information of a linked Web page which can be preserved, such as link information 416 of a voice guidance. As described above, FIG. 9 shows the example of the case where the license for trial version is set. The URL information of the linked Web page which can be preserved corresponds to the URL information contained in second information 106-3 shown in FIG. 6. For example, when the user selects link information 416 of the voice guidance and then touches preservation button 403, CPU 100 determines whether link information 416 of the voice guidance matches with any URL information contained in second information 106-3. When link information 416 of the voice guidance matches with any URL information contained in second information 106-3, communication interface 122 receives audio data of the voice guidance, based on link information 416 of the voice guidance, and hard disk unit 110 preserves contents of the audio data.

On the other hand, display 138 also displays, at the lower left side thereof, the URL information of the linked Web page which can not be preserved in image forming apparatus MFP in the case where the license for trial version is given to image forming apparatus MFP, such as dragonfly image 418 and link information 420 of the company profile. The URL information of the linked Web page which can not be preserved corresponds to URL information which is not contained in second information 106-3 shown in FIG. 6. For example, in the case where the user touches preservation button 403, when the URL information of the linked Web page does not match with any URL information contained in second information 106-3, image forming apparatus MFP does not execute the preserving process even when the user touches preservation button 403.

Figure 16:
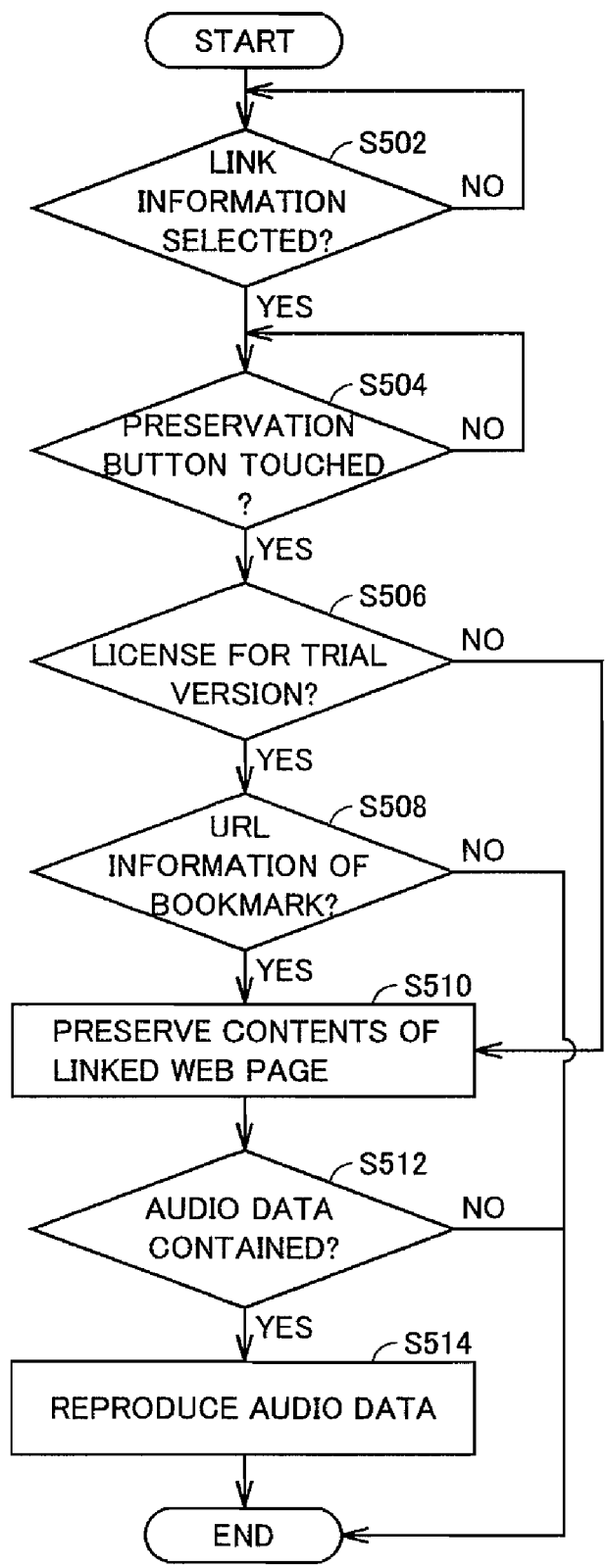
FIG. 16 is a flowchart showing a procedure of a preserving process in the image forming apparatus.

FIG. 16 is a flowchart showing a procedure of the preserving process in image forming apparatus MFP. As shown in FIGS. 9 and 16, for example, when the user selects link information 416 of the voice guidance on display 138 (YES in step S502) and then touches preservation button 403 on display 138 (YES in step S504), CPU 100 reads a function (a control program) corresponding to coordinates of the portion touched by the user from S-RAM 104 and acquires an execution command for executing the function (the control program).

More specifically, CPU 100 determines that the execution command indicates preservation of a linked Web page, acquires first information 106-2 from NV-RAM 106, and determines whether the license for trial version is set (step S506).

When the license for trial version is set (YES in step S506), CPU 100 compares the URL information contained in second information 106-3 preserved in NV-RAM 106 with the URL information of the linked Web page in the transmittable/receivable folder (step S508).

On the other hand, when the license for full version rather than the license for trial version is set (NO in step S506), communication interface 122 receives contents of the linked Web page and hard disk unit 110 stores the contents (step S510). More specifically, when CPU 100 determines that the license for full version is set (NO in step S506), hard disk unit 110 preserves the contents of the linked Web page in a segmented memory region, that is, a "box" and display 138 displays a message about completion of the preserving process.

When the license for trial version is set (YES in step S506) and the URL information of the linked Web page matches with any URL information contained in second information 106-3 (YES in step S508), communication interface 122 receives the contents of the linked Web page and hard disk unit 110 stores the contents (step S510). When the URL information of the linked Web page does not match with any URL information contained in second information 106-3 (NO in step S508), communication interface 122 fails to access the external address. That is, image forming apparatus MFP does not execute the receiving process and the preserving process even when the user touches preservation button 403.

When the contents of the linked Web page are preserved in the predetermined box in hard disk unit 110 (step S510), CPU 100 determines whether the preserved contents contain audio data (step S512). When the contents preserved in the box contain audio data (YES in step S512), CPU 100 expands the audio data to S-RAM 103, and audio output unit 140 reproduces the audio data (step S514). In order to identify the audio data, herein, CPU 100 identifies an extension of a file or identifies a header of the file. Moreover, the audio data preserved in the box can be reproduced in the box when the user touches "box" icon 303 shown in FIG. 8.

When the contents preserved in the box contain no audio data (NO in step S512), CPU 100 completes the preserving process.

<Editing Process>

Image forming apparatus MFP according to this embodiment has the following configuration. That is, even when the license for trial version is given to image forming apparatus MFP, image forming apparatus MFP transmits a scan image to server SRV through use of a scan image transmitting function, and server SRV performs edits on the image. Then, image forming apparatus MFP can perform pull print on data of the image subjected to the image editing process in server SRV. Examples of the image editing process may include an OCR process, a file format conversion process, a translation process, a process of binding an uploaded image to an image stored previously, and the like.

In image forming apparatus MFP according to this embodiment, when the image file is transmitted to the transmittable/receivable folder on the Web site in the image data transmitting process (step S412), CPU 100 writes a file name and URL information of the image file in image table 106-5 stored in hard disk unit 110. As shown in FIG. 7, "ImageA.jpg" or "ImageB.tif" corresponds to the file name of the image data transmitted from image forming apparatus MFP, and "http://yyyy.com/ScanFolder1/ImageA.*" or "http:yyyy.com/ScanFolder1/ImageB.*" corresponds to URL information of the preserved image which can be subjected to pull print. The file extension of the URL information is provided with an asterisk (*) which denotes a wildcard. This asterisk denotes that the extension of the file is not particularly limited. For example, even when the uploaded image file is subjected to file conversion from "ImageA.jpg" to "ImageA.pdf" in the image editing process, image forming apparatus MFP, to which the license for trial version is given, can perform pull print on the image file "ImageA.pdf".

Figure 17:
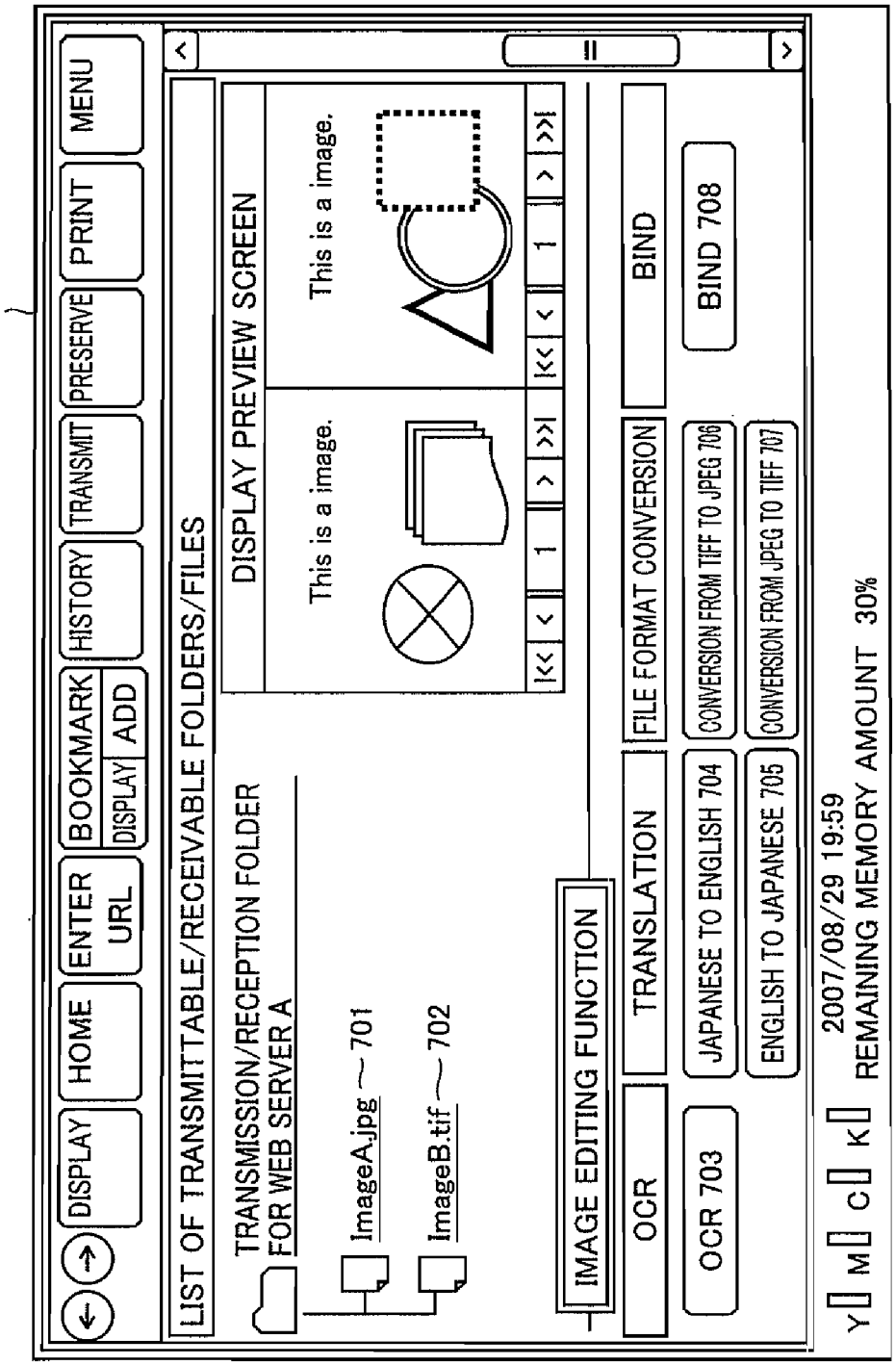
FIG. 17 conceptually shows a screen that displays a folder which can be edited by the image forming apparatus.

FIG. 17 conceptually shows a screen that displays a folder which can be subjected to edits by image forming apparatus MFP. More specifically, FIG. 17 shows the following case. That is, when the user selects link information 422 of the folder for Web server A on display 138 shown in FIG. 9 and then touches display button 411, display 138 displays a list of editable folders/files stored in server SRV. This screen corresponds to a screen that displays a list of folders which can be transferred between server SRV and image forming apparatus MFP in a browser for full version and a browser for trial version. That is, functions displayed on the screen shown in FIG. 17 can be utilized even upon activation of the browser for trial version.

FIG. 18 conceptually shows details of data received from server SRV. As shown in FIG. 18, in this embodiment, the data transmitted from server SRV to image forming apparatus MFP is in a well-known HTML format. For example, the data transmitted from server SRV to image forming apparatus MFP contains folder link information and file link information. Image forming apparatus MFP receives the data in the HTML format shown in FIG. 18 to display the image editing screen shown in FIG. 17.

As shown in FIG. 17, display 138 displays, at the vertically central left side thereof, link information 701 of the image file "ImageA.jpg", link information 702 of the image file "ImageB.tif", and the like. These pieces of link information are displayed as a list in such a manner that CPU 100 extracts, from data received from server SRV, link information 801 of the image file "ImageA.jpg" in the transmission/reception folder for Web server A and link information 802 of the image file "ImageB.tif" in the transmission/reception folder for Web server A.

Display 138 also displays, at the vertically central right side thereof, two preview screens that allow the user to preview an image of the image file "ImageA.jpg" and an image of the image file "ImageB.tif" displayed at the vertically central left side. When the user selects these files and then touches display button 411 on display 138, CPU 100 allows display 138 to display the contents of the image files as preview images in accordance with the procedure of the displaying process described above.

Display 138 also displays, at the lower left side thereof, an OCR button 703. When the user selects the preview image and then touches OCR button 703, CPU 100 scans target image data to detect text data. CPU 100 converts the image data to text data, based on this detected text data.

Display 138 also displays, at a horizontally central lower side thereof, a "Japanese-to-English" translation button 704 and an "English-to-Japanese" translation button 705. When the user selects the preview image and then touches "Japanese-to-English" translation button 704, CPU 100 determines whether the text data of the displayed image contains a Japanese sentence. When the text data of the displayed image contains a Japanese sentence, CPU 100 analyzes the Japanese sentence, and performs an edit on the image to translate the Japanese sentence into an English sentence. On the other hand, when the user selects the preview image and then touches "English-to-Japanese" translation button 705, CPU 100 determines whether the text data of the displayed image contains an English sentence. When the text data of the displayed image contains an English sentence, CPU 100 analyzes the English sentence, and performs an edit on the image to translate the English sentence into a Japanese sentence.

Display 138 also displays, at the horizontally central lower side thereof, a "TIFF-to-JPEG" conversion button 706 and a "JPEG-to-TIFF" conversion button 707. When the user selects the preview image and then touches "TIFF-to-JPEG" conversion button 706, CPU 100 converts the displayed image, in a case where such an image is in a TIFF format, from the TIFF format to a JPEG format. On the other hand, when the user selects the preview image and then touches "JPEG-to-TIFF" conversion button 707, CPU 100 converts the displayed image, in a case where such an image is in a JPEG format, from the JPEG format to a TIFF format.

Display 138 also displays, at the lower right side thereof, a bind button 708. When the user selects the two images displayed on the preview screens and then touches bind button 708, CPU 100 binds the two preview images to generate one file. For example, CPU 100 generates, from the image file "ImageA.jpg" and the image file "ImageB.tif", a new image file "ImageA.jpg" containing the image data of the image file "imageB.tif".

Figure 19:
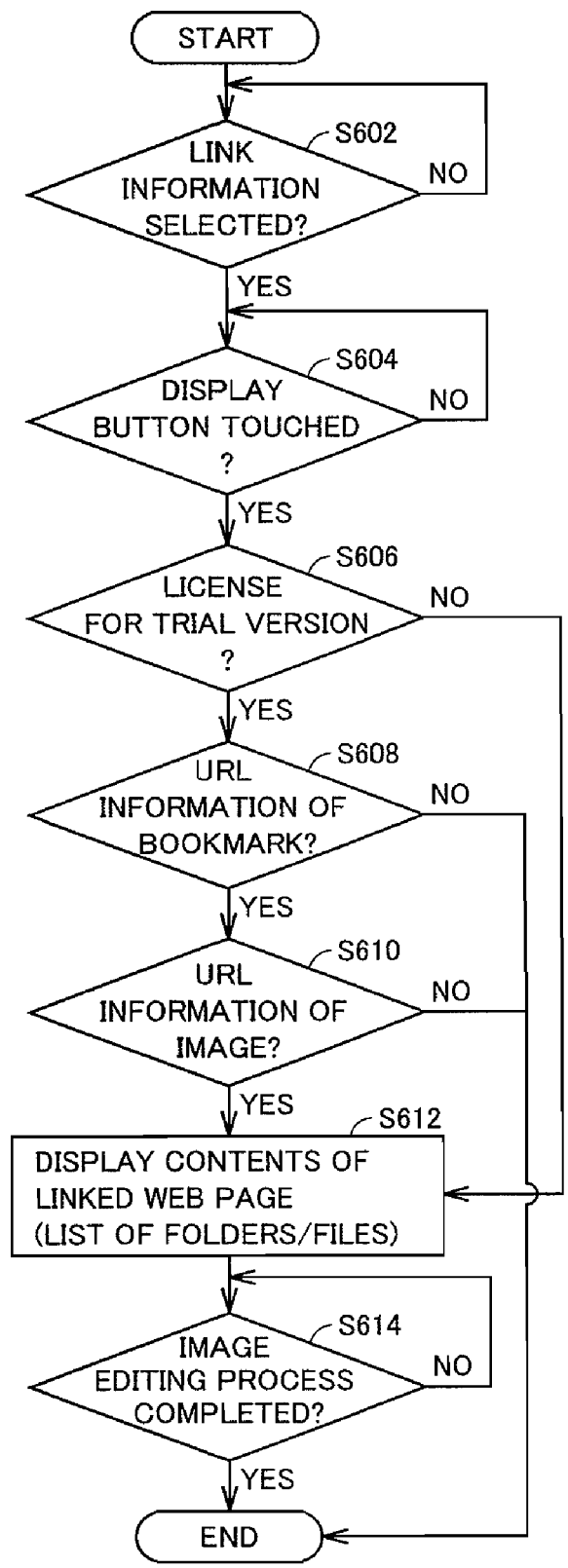
FIG. 19 is a flowchart showing a procedure of an editing process in the image forming apparatus.

FIG. 19 is a flowchart showing a procedure of the editing process in image forming apparatus MFP. It is assumed herein that the user previously selects link information 422 of the transmission/reception folder for Web server A and then touches transmission button 404 such that the transmitting process shown in FIG. 14 is completed. After completion of the image data transmitting process (step S412), CPU 100 writes the information of the transmitted image in image table 106-5. As shown in FIG. 7, herein, description will be given of a case where the image "ImageA.jpg" and the image "ImageB.tif", each of which is data to be edited, are transmitted previously to the folder "http://yyyy.com/ScanFolder1/" for the Web server.

As shown in FIGS. 9 and 19, when the user selects link information 414 of the operation manual on display 138 (YES in step S602) and then touches display button 411 on display 138 (YES in step S604), CPU 100 reads a function (a control program) corresponding to coordinates of the portion touched by the user from S-RAM 104 and acquires an execution command for executing the function (the control program).

More specifically, CPU 100 determines that the execution command indicates display of a linked Web page, acquires first information 106-2 from NV-RAM 106, and determines whether the license for trial version is set (step S606).

When the license for trial version is set (YES in step S606), CPU 100 compares the URL information contained in second information 106-3 preserved in NV-RAM 106 with URL information of the linked Web page (step S608).

On the other hand, when the license for full version rather than the license for trial version is set (NO in step S606), display 138 displays contents of the selected Web page as shown in FIG. 17 (step S612).

When the license for trial version is set (YES in step S606) and the URL information of the linked Web page matches with any URL information contained in second information 106-3 (YES in step S608), display 138 displays the contents of the selected Web page as shown in FIG. 17 (step S612). On the other hand, when the URL information of the linked Web page does not match with any URL information contained in second information 106-3, CPU 100 determines whether the URL information of the linked Web page matches with the URL information registered in image table 106-5 (step S610).

When any URL information registered in image table 106-5 matches with the URL information of the Web page received from server SRV (e.g., link information 801 of the image file "ImageA.jpg" in the transmission/reception folder for Web server A), display 138 displays the list of the folders/files shown in FIG. 17 (step S612). As described above, the asterisk (*) that denotes a wildcard can be attached to the extension of the file having the URL information registered in image table 106-5. Therefore, CPU 100 determines that two image files, which are equal in file name to each other, match with each other irrespective of a type of an extension if the asterisk (*) is attached to each of extensions of the two image files.

For example, when the URL information of the selected Web page (e.g., link information 803 of an image file "ImageC.pdf" in the transmission/reception folder for Web server A) does not match with any URL information registered in image table 106-5 (NO in step S610), communication interface 122 fails to access the external address and display 138 fails to display the list of the folders/files shown in FIG. 17.

Herein, CPU 100 performs edits on the image which is uploaded previously onto server SRV by execution of the transmitting process. Therefore, it is assumed herein that the URL information of the linked Web page matches with any URL information registered in image table 106-5 (YES in step S610). As described above, when the URL information of the linked Web page matches with any URL information registered in image table 106-5 (YES in step S610), display 138 displays the contents of the selected Web page as shown in FIG. 17 (step S612).

In the state that display 138 displays the contents of the selected Web page as shown in FIG. 17, the user performs the editing process on the target data (step S614). For example, when the user selects link information 701 of the image file "ImageA.jpg" displayed at the vertically central left side of display 138, CPU 100 downloads the image file "ImageA.jpg" from the server SRV, expands the image file "ImageA.jpg" to S-RAM 103, and allows display 138 to display the image data as a preview image on the preview screen.

Next, when the user selects a desired preview screen and then touches, for example, "JPEG-to-TIFF" conversion button 707, CPU 100 converts the image file "ImageA.jpg" from the JPEG format to the TIFF format, and uploads the converted data onto the transmittable/receivable folder for server SRV (YES in step S614). Thus, the editable (transmittable/receivable) folder is updated to a latest state.

In the browser for trial version, when the user requests to access the image data subjected to the editing process, the URL information registered in image table 106-5 matches with the URL information of the linked Web page. Therefore, the user can perform the displaying process shown in FIG. 10 and the printing process (pull print) shown in FIG. 11 on the edited image data. Of course, if the file name of the uploaded image file is changed or the image file is moved to another folder through manipulations from another image forming apparatus MFP or a personal computer, image forming apparatus MFP, to which the license for trial version is given, can not perform pull print.

<Scan Image Deleting Process>

In image forming apparatus MFP and server SRV according to this embodiment, a scan image transmitted to the folder for server SRV (Web site) can be deleted in a trial period. For example, server SRV may delete the uploaded scan image. In a case where the user purchases a license of a browser for full version during the trial period, the scan image, which has been already uploaded, may be deleted automatically at the time when the trial period expires.

Figure 20:
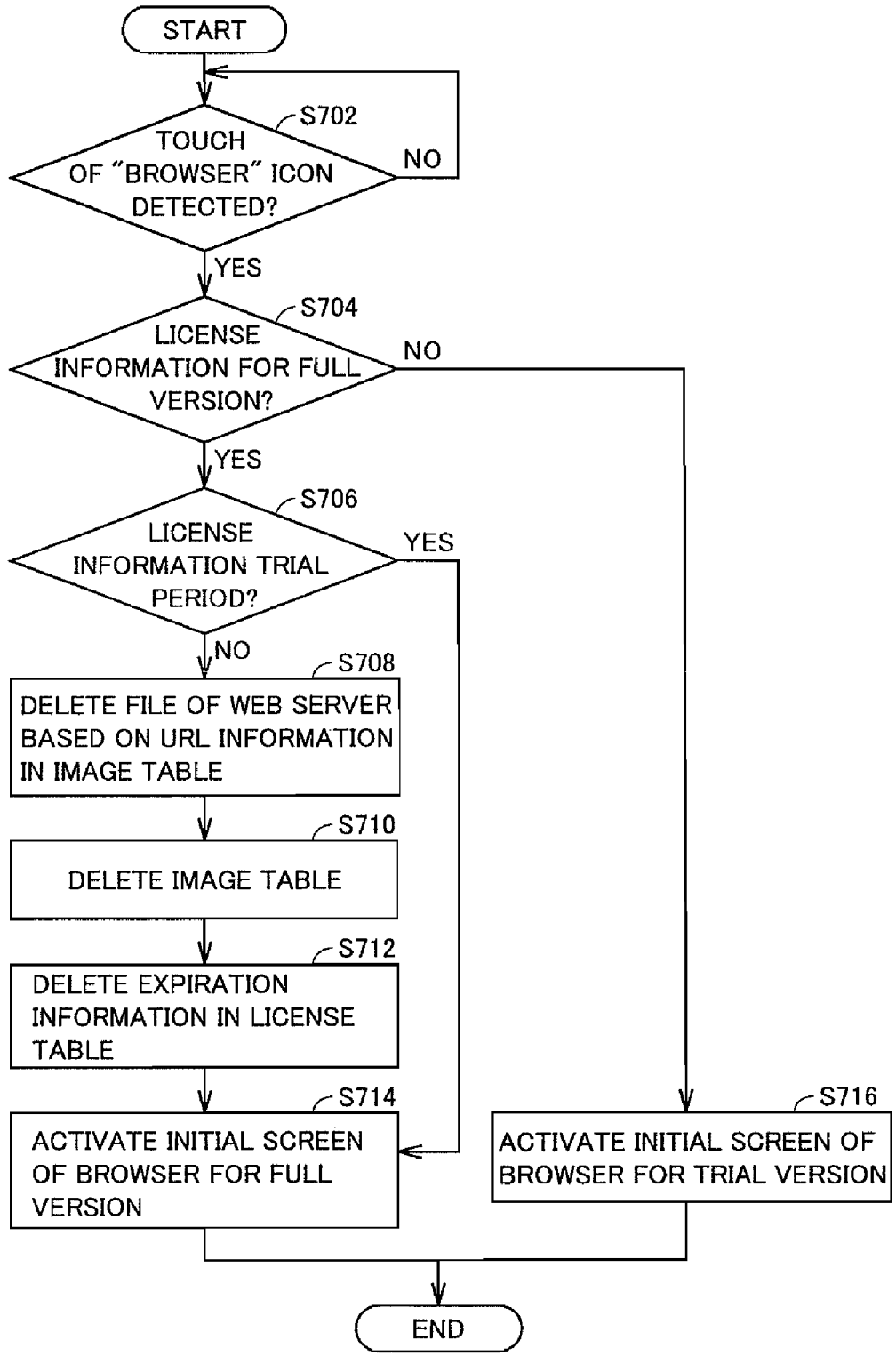
FIG. 20 is a flowchart showing a procedure of a scan image deleting process in the image forming apparatus and the server.

FIG. 20 is a flowchart showing a procedure of a scan image deleting process in image forming apparatus MFP and server SRV. It is assumed herein that when the user purchases a license for full version, first information (license information) 106-2 which is shown in FIG. 5 and is preserved in NV-RAM 106 by a service person changes from that of the license for trial version to that of the license for full version. With regard to expiration information in first information 106-2, the expiration date which is used in the case of the license for trial version is applied as it is. In the case shown in FIG. 5, the expiration date "2007/02/21" is applied as it is.

With regard to the display of "browser" icon 304 shown in FIG. 8, as described above, in a case where CPU 100 acquires first information 106-2 from NV-RAM 106 and the license for full version or the license for trial version is set, display 138 displays browser icon 304.

As shown in FIG. 20, when the user touches "browser" icon 304 in order to activate the browser (YES in step S702), CPU 100 determines whether first information 106-2 is of the license for full version (step S704). When first information 106-2 is of the license for full version (YES in step S704), CPU 100 acquires the expiration information in first information 106-2 from memory 106, and determines whether the expiration information falls within the trial period (step S706).

On the other hand, when first information 106-2 is of the license for trial version (NO in step S704), display 138 activates an initial screen of the browser for trial version (step S716).

When the expiration information in first information 106-2 falls within the trial period (YES in step S706), display 138 displays an initial screen of the browser for full version (step S714). Herein, the initial screen of the browser for full version is displayed in such a manner that the user accesses a homepage address preserved in NV-RAM 106, as in the case of the browser for trial version. In the browser for trial version, no operation is performed even when the user touches URL input button 409. In the browser for full version, on the other hand, display 138 displays a URL input screen when the user touches URL input button 409.

Figure 21:
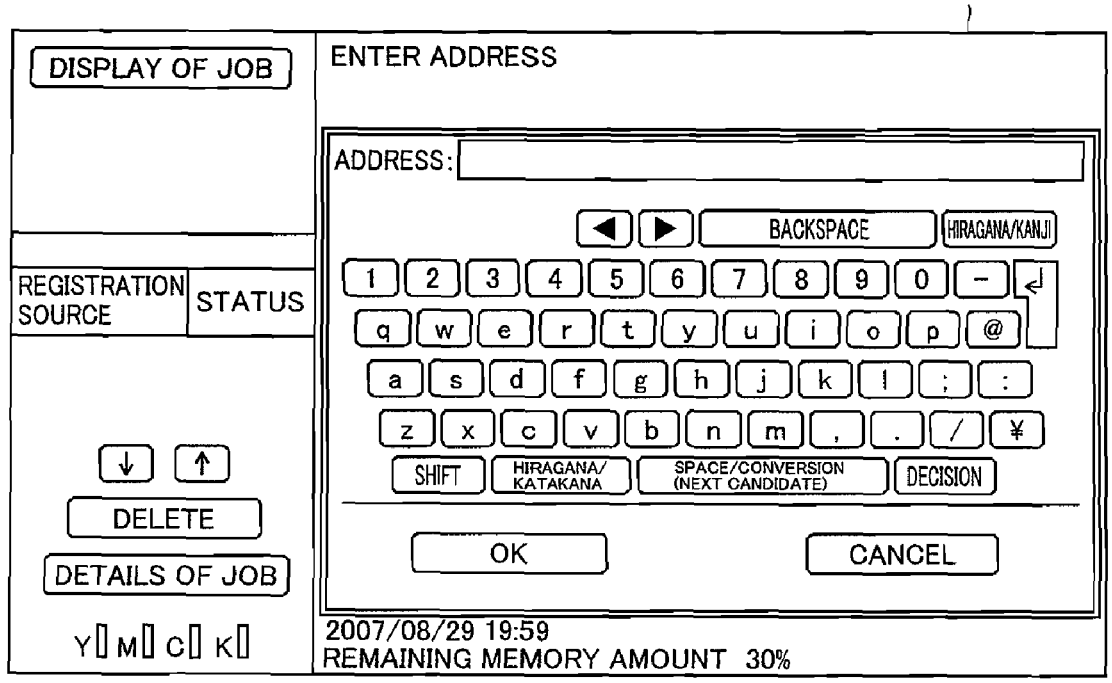
FIG. 21 conceptually shows one example of a screen for entering a URL.

FIG. 21 conceptually shows one example of the URL input screen. In the license for full version, when the user touches URL input button 409 shown in FIG. 9, display 138 displays the URL input screen shown in FIG. 21.

With regard to a display button 407 for a bookmark 406 on the initial screen of the browser for full version, reuse of the second information, which is used during the period of the browser for trial version, allows use of the bookmark which is used during the trial period after the user purchases the license for full version.

When the trial period of the expiration information contained in first information 106-2 expires (NO in step S706), image forming apparatus MFP deletes all the files contained in the URL information registered in image table 106-5, from the folder for server SRV (step S708). Moreover, image table 106-5 is dedicated to the browser for trial version and, therefore, is not used in the browser for full version. For this reason, CPU 100 deletes image table 106-5 from NV-RAM 106 (step S710). In addition, CPU 100 deletes the expiration information contained in first information 106-2 from NV-RAM 106 (step S712). Finally, CPU 100 allows display 138 to display the initial screen of the browser for full version (step S708).

As described above, image forming apparatus MFP according to this embodiment brings about the following advantages. That is, the user enjoys the browser for trial version based on the license for trial version by which access to external addresses is restricted. This browser for trial version protects image forming apparatus MFP from an adverse effect due to access to a harmful Web site or a charged Web site, and avoids loss of an opportunity to use image forming apparatus MFP by one user because another user views a Web page on the operating panel of image forming apparatus MFP. Further, the user can grasp the convenience of the Web browser.

Moreover, the user obtains the operation manual and the voice guidance from the browser for trial version. As a result, the user becomes very interested in the browser for full version. After purchase of the license for full version, the user can continuously use the data obtained during the trial period. Therefore, image forming apparatus MFP according to this embodiment can improve convenience for the user.

Other Embodiments

A program according to the present invention may be a program which is executed in such a manner that a required one of program modules provided as a part of an operating system (OS) in a computer is called in predetermined sequence at predetermined timing. In such a case, the program itself contains no modules described above and is executed in cooperation with the OS. The program containing no modules may be involved in the program according to the present invention.

Moreover, the program according to the present invention may be a program which is provided while being incorporated into a part of a different program. Also in such a case, the program itself contains no modules to be contained in the different program and is executed in cooperation with the different program. The program incorporated in the different program may be involved in the program according to the present invention.

A program product to be provided herein is executed while being installed in a program memory such as a hard disk unit. Herein, the program product includes a program itself and a recording medium for recording the program.

Further, functions realized by the program according to the present invention may be configured partly or entirely by dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising: a communication interface for accessing Web addresses; a memory for storing predetermined addresses; a first determination unit for determining whether said image forming apparatus is in a first state that access of said image forming apparatus is limited to said predetermined addresses or a second state that said image forming apparatus is permitted to access any addresses; a second determination unit for determining whether a designated address is included in said predetermined addresses, when said first determination unit determines that said image forming apparatus is in said first state; and a permission unit for giving to said communication interface permission to access said designated address, when said second determination unit determines that said designated address is included in said predetermined addresses, wherein in said first state, use of Web browser is permitted during only a predetermined period, and in said second state, the use of said Web browser is not restricted, and wherein the image forming apparatus keeps a count of printed sheets printed based on an image data received by said communication interface and does not keep the count when the image forming apparatus is in the first state.

2. The image forming apparatus according to claim 1, wherein
when said second determination unit determines that said designated address is not included in said predetermined addresses, said permission unit prohibits said communication interface from accessing the designated address.

3. The image forming apparatus according to claim 1, wherein said memory previously stores at least one URL as said predetermined address.

4. The image forming apparatus according to claim 1, further comprising a display for displaying an image based on image data received by said communication interface.

5. An image forming apparatus comprising a communication interface for accessing Web addresses; a memory for storing predetermined addresses; a first determination unit for determining whether said image forming apparatus is in a first state that access of said image forming apparatus is limited to said predetermined addresses or a second state that said image forming apparatus is permitted to access any addresses; a second determination unit for determining whether a designated address is included in said predetermined addresses, when said first determination unit determines that said image forming apparatus is in said first state; a permission unit for giving to said communication interface permission to access said designated address, when said second determination unit determines that said designated address is included in said predetermined addresses; a printer for printing out an image based on image data received by said communication interface; and a counter for keeping a count of printed sheets of paper at the time when said printer prints, wherein when said first determination unit determines that the image forming apparatus is in the first state, said counter does not keep a count of printed sheets of paper based on said image data received by said communication interface, wherein in said first state, use of said Web browser is permitted during only a predetermined period, and in said second state, the use of said Web browser is not restricted.

6. The image forming apparatus according to claim 1, further comprising a scanner for scanning an image to obtain image data, wherein said communication interface uploads said image data onto said designated address.

7. The image forming apparatus according to claim 6, further comprising an edit unit that performs an editing process on said image data uploaded by said communication interface.

8. The image forming apparatus according to claim 7, wherein said editing process includes at least one of an OCR process, a file format conversion process, a translation process and a bind process.

9. The image forming apparatus according to claim 1, wherein said predetermined addresses include a URL for giving a voice guidance.

10. An access control method in an image forming apparatus including a communication interface for accessing Web addresses, and a memory for storing predetermined addresses, said access control method comprising the steps of: determining whether said image forming apparatus is in a first state that access of said image forming apparatus is limited to said predetermined addresses or a second state that said image forming apparatus is permitted to access any addresses; determining whether a designated address is included in said predetermined addresses, when said image forming apparatus is in the first state; and giving to said communication interface permission to access the designated address, when said designated address is included in said predetermined addresses, wherein in said first state, use of Web browser is permitted during only a predetermined period, and in said second state, the use of said Web browser is not restricted, and wherein the access control method keeps a count of printed sheets printed based on an image data received by said communication interface and does not keep the count when the image forming apparatus is in the first state.

11. The access control method according to claim 10, further comprising the step of prohibiting said communication interface from accessing the designated address, when said designated address is not included in said predetermined addresses.

12. The access control method according to claim 10, wherein
said memory previously stores at least one URL as said predetermined address.

13. The access control method according to claim 10, further comprising the step of displaying an image based on image data received by said communication interface.

14. An access control method in an image forming apparatus including a communication interface for accessing Web addresses, and a memory for storing predetermined addresses, comprising the steps of: determining whether said image forming apparatus is in a first state that access of said image forming apparatus is limited to said predetermined addresses or a second state that said image forming apparatus is permitted to access any addresses; determining whether a designated address is included in said predetermined addresses, when said image forming apparatus is in the first state; giving to said communication interface permission to access the designated address, when said designated address is included in said predetermined addresses; printing out an image based on image data received by said communication interface; keeping a count of printed sheets of paper that is not based on image data received by said communication interface, when the image forming apparatus is in said first state; and keeping a count of printed sheets of paper, when the image forming apparatus is in said second state, wherein in said first state, use of Web browser is permitted during only a predetermined period, and in said second state, the use of said Web browser is not restricted.

15. The access control method according to claim 10, further comprising the steps of:
scanning an image to obtain image data; and
uploading said image data onto said designated address through said communication interface.

16. A non-transitory computer-readable recording medium recording an access control program executed by an image forming apparatus including a processor, a communication interface for accessing Web addresses, and a memory for storing predetermined addresses, said access control program causing said processor to execute the steps of: determining whether said image forming apparatus is in a first state that access of said image forming apparatus is limited to the predetermined addresses or a second state that said image forming apparatus is permitted to access any addresses; determining whether a designated address is included in said predetermined addresses, when said image forming apparatus is in the first state; and giving to said communication interface permission to access the designated address, when said designated address is included in said predetermined addresses, wherein in said first state, use of Web browser is permitted during only a predetermined period, and in said second state, the use of said Web browser is not restricted, and wherein the access control program keeps a count of printed sheets printed based on an image data received by said communication interface and does not keep the count when the image forming apparatus is in the first state.

17. The image forming apparatus according to claim 5, wherein
when said second determination unit determines that said designated address is not included in said predetermined addresses, said permission unit prohibits said communication interface from accessing the designated address.

18. The access control method according to claim 14, further comprising the step of prohibiting said communication interface from accessing the designated address, when said designated address is not included in said predetermined addresses.

19. A non-transitory computer-readable recording medium recording an access control program executed by an image forming apparatus including a processor, a communication interface for accessing Web addresses, and a memory for storing predetermined addresses, said access control program causing said processor to execute the steps of: determining whether said image forming apparatus is in a first state that access of said image forming apparatus is limited to said predetermined addresses or a second state that said image forming apparatus is permitted to access any addresses; determining whether a designated address is included in said predetermined addresses, when said image forming apparatus is in the first state; giving to said communication interface permission to access the designated address, when said designated address is included in said predetermined addresses; printing out an image based on image data received by said communication interface; keeping a count of printed sheets of paper that is not based on image data received by said communication interface, when the image forming apparatus is in said first state; and keeping a count of printed sheets of paper, when the image forming apparatus is in said second state, wherein in said first state, use of Web browser is permitted during only a predetermined period, and in said second state, the use of said Web browser is not restricted.

* * * * *